United States Patent

Shimohara et al.

(10) Patent No.: US 7,919,545 B2
(45) Date of Patent: Apr. 5, 2011

(54) PIGMENT DISPERSION AND INK COMPOSITION USING THE SAME

(75) Inventors: Norihide Shimohara, Kanagawa (JP); Yuuichi Hayata, Tokyo (JP); Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 60 days.

(21) Appl. No.: 12/475,620

(22) Filed: Jun. 1, 2009

(65) Prior Publication Data
US 2010/0137509 A1    Jun. 3, 2010

(30) Foreign Application Priority Data

Jun. 2, 2008  (JP) ................ 2008-144775
May 29, 2009  (JP) ................ 2009-130688

(51) Int. Cl.
*C09D 11/10*    (2006.01)
(52) U.S. Cl. ........ 523/160; 524/555; 524/556; 524/577; 347/100; 106/31.6
(58) Field of Classification Search .......... 524/548, 524/555, 556, 577; 523/160; 106/31.6; 347/100
See application file for complete search history.

(56) References Cited

U.S. PATENT DOCUMENTS
2008/0241416 A1 * 10/2008 Shimohara et al. ........... 427/511

FOREIGN PATENT DOCUMENTS

| JP | 2003-026950 A | 1/2003 |
|---|---|---|
| JP | 2003-119414 | 4/2003 |
| JP | 2003-321628 | 11/2003 |
| JP | 2004-018656 | 1/2004 |
| JP | 2004-131589 | 4/2004 |
| JP | 2007-009117 | 1/2007 |

* cited by examiner

Primary Examiner — David Wu
Assistant Examiner — Vu A Nguyen
(74) *Attorney, Agent, or Firm* — Solaris Intellectual Property Group, PLLC

(57) ABSTRACT

The present invention provides a pigment dispersion containing at least a pigment at a concentration of from 2 to 50 mass % in the pigment dispersion, and a polymer having from 2 to 50 mass % of repeating units represented by the following formula (1) and from 2 to 40 mass % of repeating units represented by the following formula (2), and having a weight average molecular weight of 10,000 to 500,000. In formula (1), $R^1$ represents a hydrogen atom or a methyl group, I represents —CO—, —COO—, etc., $R^2$ represents an alkyl group having 1 to 4 carbon atoms. In formula (2), $R^4$ represents a hydrogen atom or a methyl group, J represents —CO—, —COO—, etc., $R^5$ represents a hydrogen atom, an alkyl group, an aryl group, etc., W represents a single bond or a bivalent linking group, and P represents a heterocyclic residue having a hetero ring contained in an organic pigment.

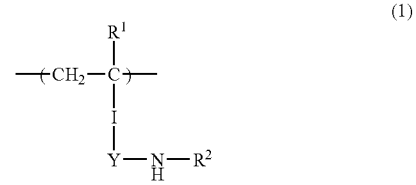

(1)

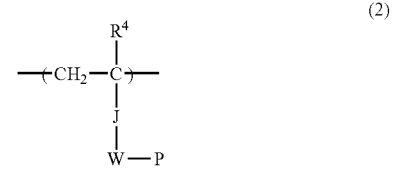

(2)

8 Claims, No Drawings

PIGMENT DISPERSION AND INK COMPOSITION USING THE SAME

CROSS-REFERENCE TO RELATED APPLICATION

This application claims priority under 35 USC 119 from Japanese Patent Applications Nos. 2008-144775 and 2009-130688, the disclosures of which are incorporated by reference herein.

BACKGROUND OF THE INVENTION

1. Field of the Invention

The present invention concerns a pigment dispersion and an ink composition using the pigment dispersion. More specifically, the present invention relates to a pigment dispersion excellent in the dispersibility and the storage stability, and an ink composition suitable to inkjet printing containing the pigment dispersion capable of forming images at high image quality, and curable by irradiation of actinic radiation rays.

2. Description of the Related Art

In a case of using a pigment as a colorant in various coloring compositions, it is important to ensure the dispersibility and the dispersion stability of the pigment as a solid. A curable composition or an ink composition having a uniform hue can be obtained by using a pigment dispersion excellent in pigment dispersibility and dispersion stability. Particularly, a pigment of excellent in light fastness is used generally as a colorant for a ink composition. However, in a case where the pigment involves a problem in view of the pigment dispersibility, this results in various problems, for example, of rendering the tone not uniform or lowering the dischargeability in a case of an ink composition used for an inkjet recording method.

In recent years, an inkjet recording method has attracted attention as an image recording method of forming images on a medium to be recorded based on image data signals. The inkjet recording method has advantages of generating less noises, and is also capable of recording highly fine images at a low running cost by hitting extremely small liquid droplets.

According to the inkjet recording method, while printing is possible not only to plain paper but also to a not-liquid absorbing medium to be recorded such as a plastic sheet or a metal plate, it is desired to shorten the time necessary for drying and curing for attaining higher speed and higher image quality upon printing. For this purpose, one of inkjet methods involves a recording method of using an ink that can be cured in a short time by irradiation of actinic energy rays as an inkjet recording ink. According to this method, clear and sharp images can be formed by irradiating actinic energy rays just after printing thereby curing ink droplets. For such a curable inkjet composition, high pigment dispersibility and aging stability thereof are demanded for forming highly fine images of excellent coloring property and stably discharging the ink composition.

For providing the ink composition with a clear tone and a high coloring power, it is essential that the pigment is made finely particulate. Particularly, in an ink composition used for inkjet recording, since discharged ink droplets give a significant effect on the clearness and sharpness of images, the amount of the discharged liquid droplets is decreased and it is essential to use particles which are finer than the thickness of the cured ink film formed from the ink composition. However, as the pigment particles are made finer for obtaining a higher coloring power, dispersion of fine particles becomes difficult tending to form aggregates. Further, this also results in a problem that the viscosity of the composition increases by excessive addition of the dispersing agent. Since the generation of pigment aggregates and increase of the viscosity of the ink composition gives an undesired effect on the ink dischargeability, it is not preferred to use an ink composition suffering from pigment aggregates or increase of viscosity for inkjet recording.

Further, in a case of using the ink composition as the inkjet recording, it is necessary that heat cycle characteristics are excellent. The ink composition used for inkjet recording is contained in a cartridge and heated upon discharge for lowering the liquid viscosity, and temperature is lowered in a discharge-rest period or during storage. Then the composition undergoes repetitive temperature change of heating and cooling. The change of temperature also gives an undesired effect on the pigment dispersibility to result in a problem of lowering the pigment dispersibility with time, thereby tending to cause aggregation of the pigment and increase of the viscosity.

A method of manufacturing an ink composition containing a fine pigment dispersion includes a method of previously preparing a concentrated pigment dispersion (also referred to as a mill base) and diluting the obtained mill base with a desired liquid such as a solvent or a polymerizable compound, thereby obtaining an ink composition. However, since the mill base is a concentrated pigment dispersion, interaction exerts strongly between pigments thereby tending to increase the viscosity during dispersion or storage. Increase of the viscosity of the mill base is not preferred since this increases the burden on a manufacturing machine, as well as results in lowering of the manufacturing stability due to circulation failure or lowering of the re-dispersibility upon ink preparation. With the view point described above, it has been demanded for a mill base having sufficient fluidity and storage stability, and an ink composition used for inkjet having sufficient fluidity in which a finely particulate pigment is dispersed uniformly and which is also excellent curability.

For the dispersing agent for obtaining a stable ink composition, various proposals have been made as described below. That is, an ink composition using a pigment derivative as a dispersing agent for improving the affinity with a pigment (for example, refer to Japanese patent application laid-open (JP-A) Nos. 2003-119414 and 2004-18656), an ink composition using a polymer having a basic group as a dispersing agent to a specified pigment such as a phthalocyanine or a quinacridone type (for example, refer to JP-A No. 2003-321628), an ink composition not using an organic solvent and containing a dispersing agent such as a poly(ethyleneimine)-poly(12-hydroxystearic acid) graft polymer and a specified monomer for dissolving the dispersing agent (for example, refer to JP-A No. 2004-131589), or an ink composition using a graft copolymer having a heterocyclic residue that forms an organic pigment as a dispersing agent (for example, refer to JP-A No. 2007-9117) have been disclosed.

The pigment dispersion or the ink composition disclosed in the documents described above can indeed disperse the pigment finely and the stability of the ink composition is improved more than that in existent cases, but there is still a room for the improvement the stability of the ink composition. Further, also for an ink composition of excellent stability, improvement has been demanded for the stability of the mill base.

SUMMARY OF THE INVENTION

The present invention has been made in view of the circumstances described above.

A first aspect of the invention is to provide a pigment dispersion containing at least a pigment at a concentration of form 2 to 50 mass % in the pigment dispersion, and a polymer having 2 to 50 mass % of repeating units represented by the following formula (1) and 2 to 40 mass % of repeating units represented by the following formula (2) and having a weight average molecular weight of 10,000 to 500,000 (hereinafter sometimes referred to as a "specific polymer").

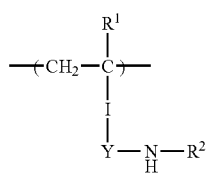

(1)

In formula (1), $R^1$ represents a hydrogen atom or a methyl group. I represents —CO—, —COO—, $CONR^3$—, —OCO—, or a phenylene group; and $R^3$ represents a hydrogen atom, an alkyl group, an aryl group or an aralkyl group. Y represents a single bond or a bivalent linking group. $R^2$ represents an alkyl group having 1 to 4 carbon atoms, and $R^2$ and Y may be bonded to each other to form a ring structure.

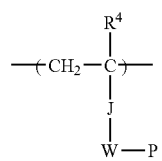

(2)

In formula (2), $R^4$ represents a hydrogen atom or a methyl group, J represents —CO—, —COO—, —$CONR^5$—, —OCO—, or a phenylene group; and $R^5$ represents a hydrogen atom, an alkyl group, an aryl group, or an aralkyl group. W represents a single bond or a bivalent linking group. P represents a heterocyclic residue having a heterocyclic ring contained in an organic pigment.

The pigment dispersion may further contain a polymerizable compound.

A second aspect of the invention is to provide an ink composition containing at least a pigment dispersion containing the polymerizable compound and a polymerization initiator, in which the concentration of the pigment is from 1 to 10 mass %.

DETAILS DESCRIPTION OF THE INVENTION

The pigment dispersion and the ink composition using the same of the present invention are to be described specifically. In the present specification, a phrase " . . . to . . . " represents a range including the numeral values represented before and after "to" as a minimum value and a maximum value, respectively.

1. Pigment Dispersion

The pigment dispersion of the invention contains at least a pigment and a specific polymer, in which the concentration of the pigment is from 2 to 50 mass %. The pigment dispersion of the invention preferably has an embodiment of further containing a polymerizable compound.

The pigment dispersion of the invention is a pigment dispersion in which the pigment is dispersed finely, and which is excellent in the dispersion stability of the pigment when it is stored for a long time.

In the pigment dispersion of the invention, even if the pigment is contained at a high concentration, viscosity does not readily increase, the dispersibility of the pigment is high, and the dispersion stability thereof can be maintained due to the effect of the specific polymer. Further, a pigment dispersion excellent in color formation and coloring ability can be obtained by selecting a fine pigment as the pigment.

Since the dispersibility and the dispersion stability of the pigment are good, the pigment dispersion of the invention can be diluted and utilized for various applications. For example, to enhance the productivity of the pigment dispersion, physical properties of a liquid, coloring properties, curability, physical properties of a cured film, and the like, can be controlled by preparing a concentrated pigment dispersion (mill base) and diluting the same, thereby enabling various applications thereof, for example, for ink compositions, colored curable compositions, and resists for color filters. Further, since the ink composition containing the pigment dispersion of the invention is excellent in dispersion stability even at a low viscosity, the discharge stability upon printing images by using an inkjet printer is excellent.

The pigment dispersion of the invention can be used suitably as a colored curable composition capable of being cured by the irradiation of actinic energy rays, by incorporating a pigment, a specific polymer, and a polymerizable compound. Such a colored curable composition is suitable as a curable ink composition that can be cured by the irradiation of actinic energy rays or by heating, and can be used particularly as an ink composition used for inkjet printing. The ink composition used for inkjet printing to which the pigment dispersion of the invention is applied has a clear tone and a high coloring ability, and can form high-quality images. Further, since this ink composition used for inkjet printing can directly form high-quality images based on digital data on non-absorptive recording media, it can be used suitably for the preparation of printed material having a large area.

In addition to an ink composition used for inkjet printing, the pigment dispersion of the invention, when prepared as an ink composition mixed with a chemical substance to provide a desired performance, can form sharp images having excellent color forming properties to obtain high-quality printed material when using the ink composition in normal printing. That is, since the ink composition of the invention is excellent in dispersibility in an organic medium, it can form images having a sharp hue also when it is used for a non-curable ink. For example, a normal ink composition containing a film forming polymer, a colorant, and a solvent in which the coating film is cured by removal of the solvent after coating, such as a solvent ink using a volatile solvent such as cyclohexanone, is a preferred embodiment.

Further, the curable coloring composition to which the pigment dispersion of the invention is applied is useful not only for an ink composition, but also for a photo-shaping material, and can be used suitably also for the manufacture of a resist, a color filter, an optical disk, and the like. Further, the pigment dispersion of the invention can be used suitably over an extensive range of applications such as those requiring good coloring properties or those requiring a light-fast colorant, such as a nano-imprint composition or a surface coating agent.

Each of the ingredients in the pigment dispersion of the invention is to be described specifically.

1-1. Pigment

The pigment dispersion of the invention contains a pigment as an essential ingredient. In the pigment dispersion of the invention, the pigment is dispersed uniformly and stably in the pigment dispersion due to the effect of a specific polymer to be described later even in a case of pigment particles having a small particle diameter.

The pigment contained in the pigment dispersion of the invention is not particularly limited and various known pigments can be properly selected and used depending on the purpose. Since the specific polymer in the invention is excellent in the adsorbability, particularly, to an organic pigment due to the effect of the heterocyclic residue having a heterocyclic ring contained in the organic pigment, it is preferred that the pigment dispersion contains an organic pigment.

Since the pigment dispersion of the invention contains the pigment, it can be used suitably to an application use requiring weather proofness for the colorant, for example, a colored composition such as an ink composition. Further, in a case of applying the pigment dispersion as a coloring ingredient for various compositions, a dye may also be used in combination, with an aim of controlling the hue or the like.

The pigments contained in the pigment dispersion of the invention include commonly used organic and inorganic pigments. In addition, dyed resin particles may also be used. Any one of common commercially available pigments may be used. Further, pigments previously treated by a commercially available pigment dispersion or a surface treating agent, such as dispersions of the pigment dispersed in an insoluble resin, and pigments surface-grafted with a resin, may be used so long as the effect of the invention is not impaired.

Such pigments include the pigments described, for example, in Seijiro Itoh Ed., "Ganryo no Jiten (Dictionary of Pigments)" (2000), W. Herbst K. Hunger, Industrial Organic Pigments", and JP-A Nos. 2002-12607, 2002-188025, 2003-26978, and 2003-342503.

The organic pigments and the inorganic pigments include, for example, the following pigments.

Examples of the pigment exhibiting yellow color include monoazo pigments such as C.I. Pigment Yellow 1 (Fast Yellow G, etc.) and C.I. Pigment Yellow 74, disazo pigments such as C.I. Pigment Yellow 12 (Disazo Yellow, etc.), C.I. Pigment Yellow 17, C.I. Pigment Yellow 97, C.I. Pigment Yellow 3, C.I. Pigment Yellow 16, C.I. Pigment Yellow 83, C.I. Pigment Yellow 155, and C.I. Pigment Yellow 219, azo lake pigments such as C.I. Pigment Yellow 100 (tatrazine yellow lake, etc.), condensed azo pigments such as C.I. Pigment Yellow 95 (condensed azo yellow, etc.), C.I. Pigment Yellow 93, C.I. Pigment Yellow 94, C.I. Pigment Yellow 128, and C.I. Pigment Yellow 166, acidic dye lake pigments such as C.I. Pigment Yellow 115 (quinoline yellow lake etc.), basic dye lake pigments such as C.I. Pigment Yellow 18 (thioflavine lake, etc.), anthraquinone pigments such as flavanthron yellow (Y-24), isoindolinone pigments such as isoindolinone yellow 3RLT (Y-110), quinophthalone pigments such as quinophthalone yellow (Y-138), isoindoline pigments such as Isoindoline Yellow (Y-139), nitroso pigments such as C.I. Pigment Yellow 153 (nickel nitroso yellow, etc.), metal complex salt azomethine pigments such as C.I. Pigment Yellow 117 (copper azomethine yellow, etc.), and acetolone pigments such as C.I. Pigment Yellow 120 (benzimidazolone yellow), C.I. Pigment Yellow 151, C.I. Pigment Yellow 175, C.I. Pigment Yellow 180, C.I. Pigment Yellow 181, and C.I. Pigment Yellow 194.

Examples of the pigment exhibiting red or magenta color include monoazo pigments such as C.I. Pigment Red 3 (toluidine red, etc.), β-naphthol pigments such as C.I. Pigment Red 1, C.I. Pigment Red 4, and C.I. Pigment Red 6, disazo pigments such as C.I. Pigment Red 38 (Pyrazolone Red B, etc.), azo lake pigments such as C.I. Pigment Red 53:1 (Lake Red C, etc.), C.I. Pigment Red 57:1 (Brilliant Carmine 6B, etc.), C.I. Pigment Red 52:1, and C.I. Pigment Red 48 ((β-oxynaphthoic acid lake, etc.), condensed azo pigments such as C.I. Pigment Red 144 (condensed azo red, etc), C.I. Pigment Red 166, C.I. Pigment Red 220, C.I. Pigment Red 214, C.I. Pigment Red 221, and C.I. Pigment Red 242, acidic dye lake pigments such as C.I. Pigment Red 174 (Phloxine B lake, etc.), C.I. Pigment Red 172 (erythrosine lake, etc.), basic dye lake pigments such as C.I. Pigment Red 81 (Rhodamine 6G' lake, etc.), anthraquinone pigments such as C.I. Pigment Red 177 (dianthraquinonyl red, etc.), thioindigo pigments such as C.I. Pigment Red 88 (Thioindigo Bordeaux, etc.), perynone dyes such as C.I. Pigment Red 194 (Perynone Red, etc,), perylene pigments such as C.I. Pigment Red 149 (Perylene Scarlet, etc.), C.I. Pigment Red 179, C.I. Pigment Red 178, C.I. Pigment Red 190, C.I. Pigment Red 224, C.I. Pigment Red 123, and C.I. Pigment Red 224, quinacridone pigments such as C.I. pigment violet 19 (not substituted quinacridone), C.I. Pigment Red 122, C.I. Pigment Red 42 (Quinacridone Magenta, etc), C.I. Pigment Red 262, C.I. Pigment Red 207, and C.I. Pigment Red 209, isoindolinone pigments such as C.I. Pigment Red 180 (Isoindolinone Red 2BLT, etc.), alizarin lake pigments such as C.I. Pigment Red 83 (Madder Lake, etc.), naphthone pigments such as C.I. Pigment Red 171, C.I. Pigment Red 175, C.I. Pigment Red 176, C.I. Pigment Red 185, and C.I. Pigment Red 208, naphthol AS type lake pigments such as C.I. Pigment Red 247, naphthol AS pigments such as C.I. Pigment Red 2, C.I. Pigment Red 5, C.I. Pigment Red 21, C.I. Pigment Red 170, C.I. Pigment Red 187, C.I. Pigment Red 256, C.I. Pigment Red 268, and C.I. Pigment Red 269, diketopyrrolopyrrole pigments such as C.I. Pigment Red 254, C.I. Pigment Red 255, C.I. Pigment Red 264, and C.I. Pigment Red 27.

Examples of the pigments exhibiting blue or cyan color include disazo pigments such as C.I. Pigment Blue 25 (Dianisidine Blue, etc.), phthalocyanine pigments such as C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, and C.I. Pigment Blue 16 (Phthalocyanine Blue, etc.), acidic dye lake pigments such as C.I. Pigment Blue 24 (Peacock Blue Lake, etc.), basic dye lake pigments such as C.I. Pigment Blue 1 (bichlothia pure blue BO lake, etc.), anthraquinone type pigments such as C.I. Pigment Blue 60 (Indanthrone Blue, etc.), and alkali blue pigments such as C.I. Pigment Blue 18 (Alkali Blue V-5:1).

Pigments exhibiting green color include phthalocyanine pigments such as C.I. Pigment Green 7 (Phthalocyanine Green), C.I. Pigment Green 36 (Phthalocyanine Green), and azo metal complex pigment such as C.I. Pigment Green 8 (Nitroso Green), and C.I. Pigment Green 10.

Examples of the pigment exhibiting orange color include isoindoline pigments such as C.I. Pigment Orange 66 (Isoindoline Orange), anthraquinone type pigments such as C.I. Pigment Orange 51 (Dichloropyranthrone Orange), β-naphthol pigments such as C.I. Pigment Orange 2, C.I. Pigment Orange 3, and C.I. Pigment Orange 5, naphthol AS pigments such as C.I. Pigment Orange 4, C.I. Pigment Orange 22, C.I. Pigment Orange 24, C.I. Pigment Orange 38, and C.I. Pigment Orange 74; isoindolinone pigments such as C.I. Pigment Orange 61, perynone pigments such as C.I. Pigment Orange 43, disazo pigments such as C.I. Pigment Orange 15, and C.I. Pigment Orange 16, qunacridone pigments such as C.I. Pigment Orange 48, and C.I. Pigment Orange 49, acetolone pigments such as C.I. Pigment Orange 36, C.I. Pigment Orange 62, C.I. Pigment Orange 60, C.I. Pigment Orange 64, and C.I. Pigment Orange 72, pyrazolone pigments such as C.I. Pigment Orange 13, and C.I. Pigment Orange 34.

Examples of the pigment exhibiting brown color include naphthrone pigments such as C.I. Pigment Brown 25, and C.I. Pigment Brown 32.

Examples of the pigment exhibiting black color include inadadine pigments such as carbon black, titanium black, C.I. Pigment Black 1 (aniline black), and perylene pigments such as C.I. Pigment Black 31, and C.I. Pigment Black 32.

As specific examples of white pigment, basic lead carbonate ($2PbCO_3Pb(OH)_2$, so-called silver white), zinc oxide (ZnO, so-called zinc white), titanium oxide ($TiO_2$, so-called, titanium white), and strontium titanate ($SrTiO_3$, so-called titanium strontium white) are employable. An inorganic particle used for a white pigment may be an elemental material, or a composite particle with an oxide of silicon, aluminum, zirconium, or titanium, or an organic metal compound, and an organic compound.

Here, titanium oxide has a less specific gravity and a greater refractive index, and is chemically and physically stable, compared to other white pigments. Therefore, it has a greater concealing and coloring power as a pigment, and furthermore has a superior durability against acid, alkali, and other environment. Therefore, the titanium oxide is preferably used as a white pigment. Of course, other white pigments (may be other than the above mentioned white pigments) may be used as necessary.

Since the coloring property is more excellent as the average particle diameter is smaller for the pigment other than that of white color, in a case of applying the pigment dispersion of the invention to a pigment dispersion other than that of the white color, the average particle diameter of the pigment contained in the pigment dispersion is preferably about 0.01 μm to 0.4 μm, and more preferably form 0.02 μm to 0.3 μm. Further, the maximum particle diameter of the pigment is preferably 3 μm or less, and more preferably 1 μm or less. The particle diameter of the pigment can be controlled, for example, by selecting the pigment, the dispersing agent, and the dispersion medium, and setting dispersion conditions and filtration conditions. Further, in a case of preparing the pigment dispersion of the invention as a white pigment dispersion which is applicable, for example, to a white ink composition, the average particle diameter of the pigment contained in the pigment dispersion is preferably about 0.05 μm to 1.0 μm, and more preferably about 0.1 μm to 0.4 μm, from a view point of providing a sufficient concealing power. Also for the case of preparing the white pigment dispersion, the maximum particle diameter of the pigment is preferably 3 μm or less, and more preferably 1 μm or less.

By the control for the particle diameter as described above, for example, storage stability of the pigment dispersion, transparency of the pigment dispersion, and curing sensitivity in a case of applying the pigment dispersion to the curable composition can be maintained. Further, the head nozzle clogging can be suppressed also in a case of applying the pigment dispersion to the ink composition used for inkjet.

Since the pigment dispersion composition of the invention contains a specific polymer that has excellent pigment dispersbility and dispersion stability as a pigment dispersing agent, uniform and stable pigment dispersion is obtained also in a case of using a fine particulate pigment.

The particle diameter of the pigment in the pigment dispersion can be measured by a known measuring method. Specifically, the particle diameter of the pigment can be measured by a centrifugal sedimentation photo-transmission method, an X-ray transmission method, a laser diffraction-scattering method, or a dynamic photo scattering method.

The concentration of the pigment in the pigment dispersion of the invention is from 2 to 40 mass %, and more preferably from 2 to 25 mass %. In a case of preparing the pigment dispersion as a concentrated pigment dispersion (mill base), the concentration of the pigment in the mill base is preferably from 10 to 50 mass %, and more preferably from 15 to 50 mass %.

For the dispersion of the pigments, any of known dispersion apparatus, for example, a ball mill, a sand mill, a beads mill, an attritor, a roll mill, a jet mill, a homogenizer, a paint shaker, a kneader, an agitator, a Henschel mixer, a colloid mill, a supersonic homogenizer, a pearl mill, and a wet jet mill can be used. The specific polymer to be described below is preferably added upon dispersion of the pigment.

1-1. Specific Polymer

The pigment dispersion of the invention contains a polymer having from 2 to 50 mass % of repeating units represented by formula (1) and from 2 to 40 mass % of repeating units represented by the following formula (2), and having a weight average molecular weight of from 10,000 to 500,000 (specific polymer).

The specific polymer in the invention can provide a function as a pigment dispersing agent. Accordingly, it is particularly preferred to use the specific polymer as the pigment dispersing agent.

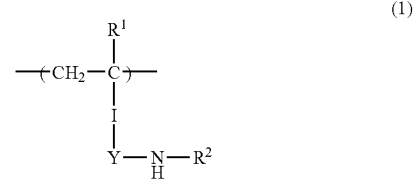
(1)

In formula (1), $R^1$ represents a hydrogen atom or a methyl group. I represents —CO—, —COO—, $CONR^3$—, —OCO—, or a phenylene group, $R^3$ represents a hydrogen atom, an alkyl group, an aryl group or an aralkyl group. Y represents a single bond or a bivalent linking group. $R^2$ represents an alkyl group having 1 to 4 carbon atoms, and $R^2$ and Y may be bonded to each other to form a ring structure.

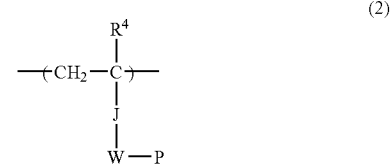
(2)

In formula (2), $R^4$ represents a hydrogen atom or a methyl group. J represents —CO—, —COO—, —$CONR^5$—, —OCO—, or a phenylene group, and $R^5$ represents a hydrogen atom, an alkyl group, an aryl group, or an aralkyl group. W represents a single bond or a bivalent linking group. P represents a heterocyclic residue having a heterocyclic ring contained in an organic pigment.

It is supposed that the specific polymer is favorably adsorbed to an organic pigment by acid-base interaction with the acidic surface of the organic pigment due to the basicity derived from the structure represented by the general (1). Further, since the specific polymer also has an effect of Vander-Waals interaction derived from the heterocyclic residue P in the repeating unit represented by formula (2), it is supposed that the adsorption of the specific with the pigment is excellent. Accordingly, a pigment dispersion having a high affinity with the pigment can be obtained. Further, since the specific polymer is a polymerizable compound having specified repetitive structural units, it can provide dispersion stability even in a non-aqueous organic solvent due to the steric repulsion effect of the polymeric chain.

Hereinafter, the repeating unit represented by formula (1) and the repeating unit represented by formula (2) contained in the specific polymer are described in detail.
(Repeating Unit Represented by Formula (1))

The specific polymer contains the repeating unit represented by the following formula (1).

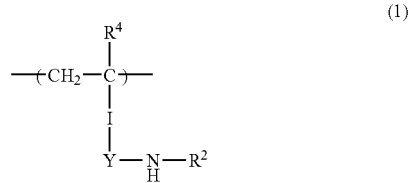

(1)

In formula (1), $R^1$ represents a hydrogen atom or a methyl group.

In formula (1), I represents —CO—, —COO—, —CONR$^3$—, —OCO—, or a phenylene group, and —COO—, —CONR$^3$—, or a phenylene group is preferred. $R^3$ represents a hydrogen atom, an alkyl group, an aryl group, or an aralkyl group, and an alkyl group having 1 to 4 carbon atoms is preferred.

In formula (1), $R^2$ represents an alkyl group having 1 to 4 carbon atoms, and a methyl group, an ethyl group, a n-butyl group, or a t-butyl group is preferred.

Further, $R^2$ may be bonded with Y to each other to form a ring structure. Example of thus formed formed ring structure includes a pyrrolidine ring, a piperidine ring, or an imidazolidine ring and, for example, it may have 1 to 4 of alkyl groups having 1 to 4 carbon atoms as the substituent as in the case of a tetramethyl piperidine ring.

In formula (1), Y represents a single bond or a bivalent linking group.

The bivalent linking group represented by Y includes, for example, a linear, branched, or cyclic alkylene group, an aralkylene group, and an arylene group, and these groups may also have a substituent.

As the alkylene group represented by Y, an alkylene group having 1 to 8 carbon atoms is preferred and an alkylene group having 1 to 4 carbon atoms is more preferred. The alkylene group includes, for example, a methylene group, an ethylene group, a propylene group, a butylenes group, a pentylene group, a hexylene group, or an octylene group. Among them, the methylene group, the ethylene group, the propylene group, and the butylene group are particularly preferred.

As the aralkylene group represented by Y, an aralkylene group having 7 to 12 carbon atoms is preferred. Examples of the aralkylene group include a benzylidene group, and a cinnamylidene group.

As the arylene group represented by Y, an arylene group having 6 to 12 carbon atoms is preferred, and the arylene group. Examples of the aralkylene group include a phenylene group, a cumenylene group, a mesitylene group, a tolylene group, and a xylylene group. Among them, the phenylene group is particularly preferred.

In the bivalent linking group represented by Y, —NR$^6$—, —COO—, —OCO—, —O—, OCOO—, —SO$_2$NH—, —NHSO$_2$—, —NHCOO—, —OCONH—, —NHCONH—, or a group derived from a heterocyclic ring may intervene as a bonding group. Here, $R^6$ represents a hydrogen atom, an alkyl group having 1 to 4 carbon atoms, or an alkylene group which may have a substituent to form a ring in conjunction with Y. Preferable example of $R^6$ includes a hydrogen atom, a methyl group, an ethyl group, a propyl group, or a branched butylene group.

Y represents more preferably a single bond or an alkylene group, and a methylene group, an ethylene group, or a 2-hydroxypropylene group is particularly preferred.

The ratio of the repeating unit represented by formula (1) contained in the specific polymer is from 2 to 50 mass %, preferably from 5 to 40 mass %, and particularly preferably from 5 to 30 mass % with respect to the mass of the specific polymer. In a case where the repeating units represented by formula (1) is introduced at the content less than the range described above, adsorption of the polymer to the pigment tends to be lowered and, in a case where they are introduced at a content more than the range described above, this increases the viscosity derived from the polymer not adsorbed to the inter-granular crosslinking or the pigment, which is not preferred.

Preferable specific examples of the monomer providing the repeating unit represented by formula (1) include, for example, those monomers shown below. However, the invention is not restricted to them.

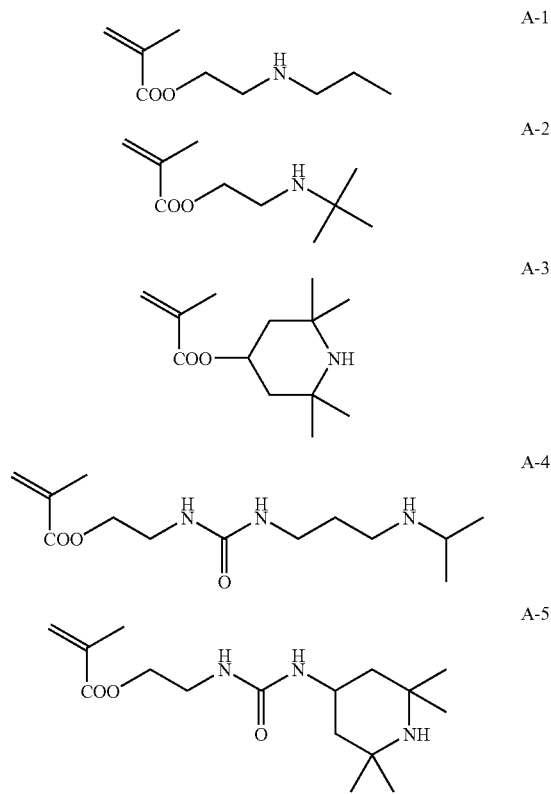

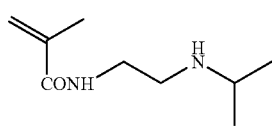

A-6

(Repeating Unit Represented by Formula (2))

The specific polymer contains the repeating unit represented by the following formula (2).

$$-\!\!\left(\!\mathrm{CH_2}\!-\!\underset{\underset{\mathrm{W-P}}{\overset{|}{\mathrm{J}}}}{\overset{\mathrm{R^4}}{\mathrm{C}}}\!\right)\!\!-$$ (2)

In formula (2), $R^4$ represents a hydrogen atom or a methyl group.

In formula (2), J represents —CO—, —COO—, —CONR$^5$—, —OCO—, or phenylene group and, among them, —COO—, —CONR$^5$—, and phenylene group is preferred. $R^5$ represents a hydrogen atom, an alkyl group (for example, a methyl group, an ethyl group, a n-propyl group, an i-propyl group, and a n-butyl group), an aryl group (for example, a phenyl group), and an aralkyl group, and the hydrogen atom or the alkyl group having 1 to 4 carbon atoms is preferred. Among them, J represents preferably —COO—, —CONH—, or a phenylne group. $R^5$ represents a hydrogen atom, an alkyl group, an aryl group, or an aralkyl group, and the hydrogen atom and an alkyl group having 1 to 4 carbon atoms are preferred.

In formula (2), W represents a single bond or a bivalent linking group.

The bivalent linking group represented by W includes, for example, a linear, branched, or cyclic alkylene group and an aralkylene group. The bivalent linking group may have a substituent.

As the alkylene group represented by W, an alkylene group having 1 to 10 carbon atoms is preferred, and an alkylene group having 1 to 4 carbon atoms is more preferred. Specific examples of the alkylene group include a methylene group, an ethylene group, a propylene group, a butylenes group, a pentylene group, a hexylene group, an octylene group, and a decylene group. Among them, the methylene group, the ethylene group, the propylene group, etc. are particularly preferred.

As the aralkylene group represented by W, an aralkylene group having 7 to 13 carbon atoms is preferred. Specific examples of the aralkylene group include a benzylidene group and a cinnamylidene group.

As the arylene group represented by W, an arylene group having 6 to 12 carbon atoms is preferred. Specific examples of the arylene group include a phenylene group, a cumenylene group, a mesitylene group, a tolylene group, and a xylylene group. Among them, the phenylene group is particularly preferred.

In the bivalent linking group represented by W, —NR$^7$—, —COO—, —OCO—, —O—, —SO$_2$NH—, —NHSO$_2$—, —NHCOO—, —OCONH—, —NHCONH—, or a group derived from a heterocyclic ring may intervene as a bonding group. Here, $R^7$ preferably represents a hydrogen atom or an alkyl group, and the hydrogen atom, a methyl group, an ethyl group, a propyl group, etc. are preferred.

W preferably represents a single bond, an alkylene group having 1 to 8 carbon atoms, an alkylene group having 1 to 8 carbon atoms, and having —COO—, —O—, —NHCOO—, —OCONH—, or —NHCONH— intervened as a bonding group, or a 2-hydroxypropylene group.

In formula (2), P represents a heterocyclic residue having a heterocyclic ring contained in an organic pigment. Here, "a heterocyclic residue having a heterocyclic contained in a organic pigment" represented by P means a group containing a heterocyclic structure identical or similar to the heterocyclic structure present in a molecule structure of an organic pigment.

Specific example of the organic pigments represented by P that is constituted while containing the heterocyclic residue include organic pigments such as a phthalocyanine type, an insoluble azo type, an azo lake type, an anthraquinone type, a quinacridone type, a dioxadine type, a diketopyrrolopyrrole type, an anthrapyrimidine type, an anthanthrone type, an indanthrone type, a flavanthrone type, a perynone type, a perylene type, a thioindigo type, and a quinophthalone type.

The heterocyclic residue represented by P includes derivatives of thiophene, furan, xanthene, pyrrole, imidazole, benzimidazole, isoindoline, isoindolinone, benzimidazolone, indole, quinoline, carbazole, acridine, acridone, quinacridone, anthraquinone, phthalimide, naphthalimide, quinaldine, and quinophthalon. Among them, P particularly preferably includes those groups formed by removing one hydrogen atom from quinacridone, benzoimidazolon, indole, quinoline, carbazole, acridine, acridone, anthraquinone, phthalimide, or naphthalimide. These residues may also have a substituent.

Heterocyclic residue represented by P particularly preferably includes a heterocyclic structure identical or similar to the heterocyclic structure of the pigment contained in the pigment dispersion. Specifically, in a case where the pigment dispersion of the invention contains a quinacridone type pigment as the pigment, P represents preferably a heterocyclic residue having acridone, anthraquinone, etc. which is a structure similar to the heterocyclic structure of quinacridone.

The ratio of the repeating unit represented by formula (2) contained in the specific polymer with respect to the mass of the specific polymer is from 2 to 40 mass %, preferably from 5 to 35 mass %, and particularly preferably from 5 to 25 mass %. In a case where the repeating unit represented by formula (2) is introduced at a content less than the range described above, adsorption of the polymer to the pigment tends to be lowered and, in a case where it is introduced at a content more than the range described above, this increases the viscosity derived from the inter-grain crosslinking or the polymer not adsorbed to the pigment, which is not preferred.

Preferable specific examples of the monomer providing the repeating unit represented by formula (2) include, for example, the monomers described below. However, the invention is not restricted to them.

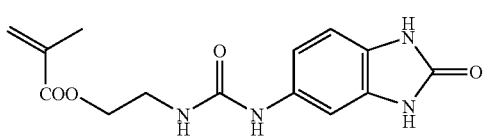

M-1

-continued
M-2
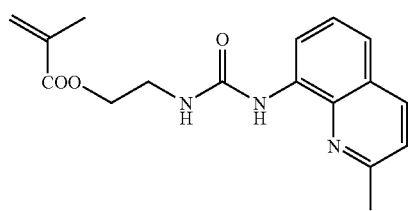
M-3
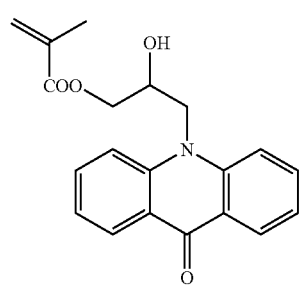
M-4
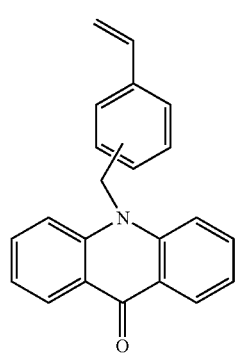
M-5
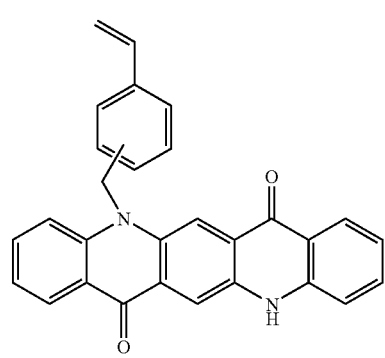
M-6
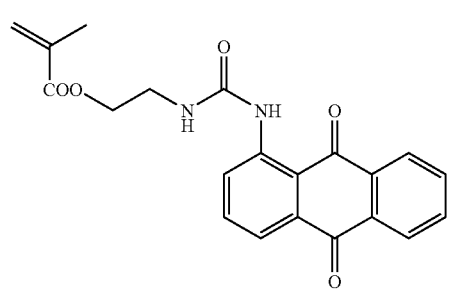
-continued
M-7
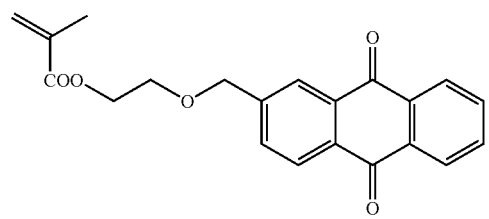
M-8
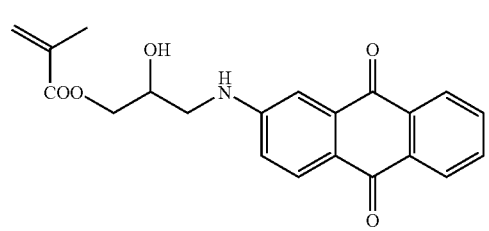
M-9
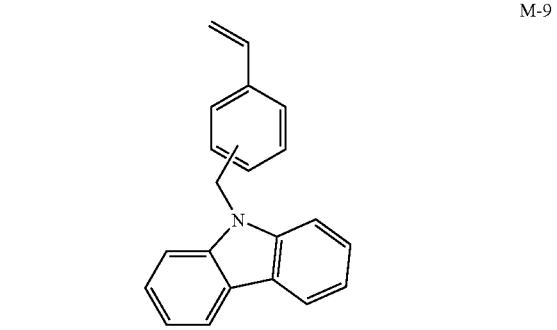
M-10
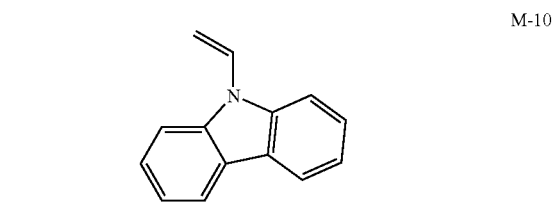
M-11
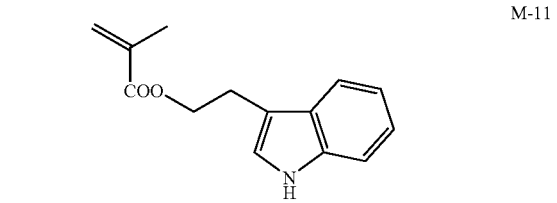
M-12
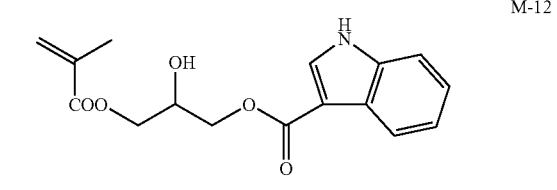
M-13
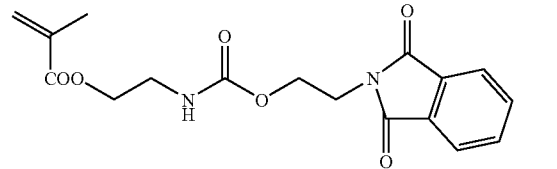

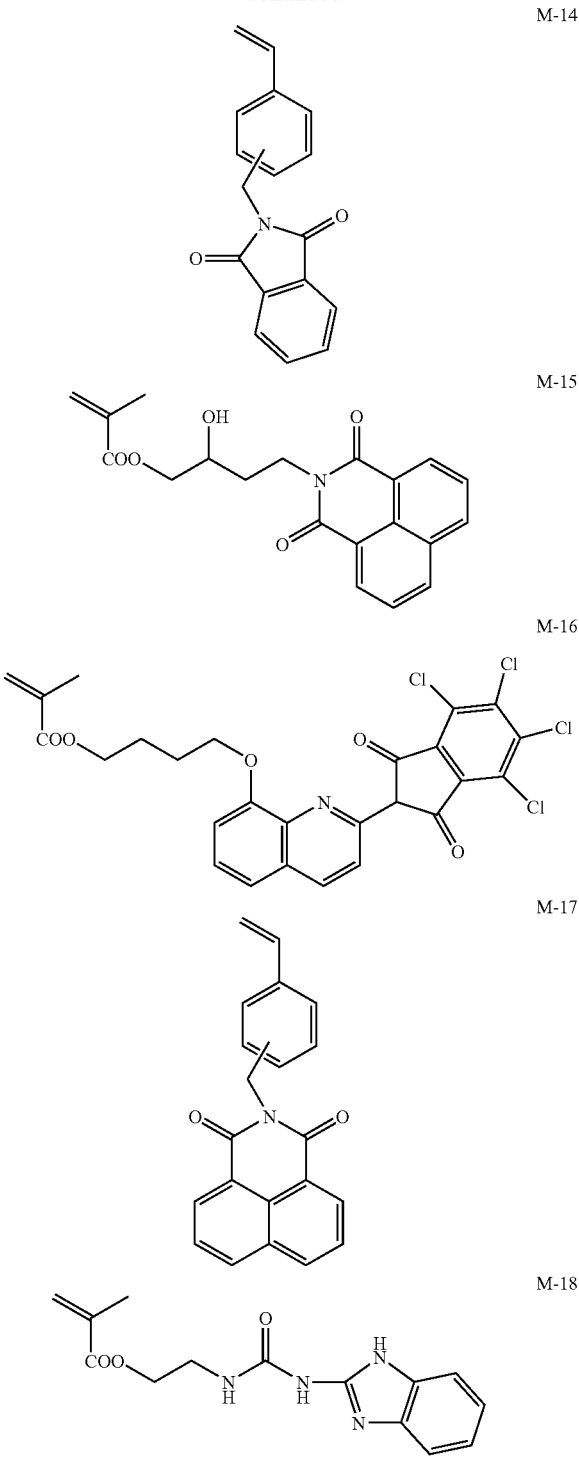

M-14

M-15

M-16

M-17

M-18

The specific polymer according to the invention may also contains another repeating units other than the repeating units represented by formulae (1) and (2), and it is particularly preferably a graft copolymer containing a repeating unit derived from a polymerizable oligomer having an ethylenically unsaturated double bond at a terminal end thereof (hereinafter simply referred to as a "polymerizable oligomer"). Such a polymerizable oligomer having an ethylenically unsaturated double bond at a terminal end thereof is also referred to as a macro monomer since the oligomer is a compound having a predetermined molecular weight.

Since the repeating unit derived from the polymerizable oligomer is contained, the specific polymer according to the invention can disperse a pigment more stably by the high affinity of the polymerizable oligomer to a liquid medium. Accordingly, it is preferred that the polymerizable oligomer has a high affinity to the liquid medium. The affinity of the polymerizable oligomer to the liquid medium can be estimated, for example, by a solubility parameter proposed by HOY (see, for example, to "Journal of Paint Technology", 1970, vol. 42, pages 76-78).

Since it is considered that the solubility of a solute to a solvent is favorable in a case where the values of solubility parameters δt are close between the solute and the solvent, the solubility parameter of the polymerizable oligomer to the solubility parameter of the liquid medium is preferably from 80% to 120%, and more preferably from 85% to 115%. This preferred range of the solubility parameter for the polymerizable oligomer is also identical for the ink composition, etc. formed by applying the pigment dispersion of the invention. In a case where the value of the solubility parameter is within the range described above, the structure of the polymerizable oligomer is not particularly limited. When the solubility parameter of the polymerizable oligomer is within the range described above, the dispersion stability of the pigment contained in the pigment dispersion is more excellent.

The polymerizable oligomer has a polymer chain moiety and a polymerizable functional group moiety having an ethylenically unsaturated double bond at a terminal end thereof. It is preferred that the group having the ethylenically unsaturated double bond is present only on one terminal end of the polymer chain from a view point of obtaining a desired graft polymer. As the group having the ethylenically unsaturated double bond, a (meth)acryloyl group and a vinyl group are preferred, and a (meth)acryloyl group is particularly preferred.

The polymer chain moiety in the polymerizable oligomer is generally a homopolymer or a copolymer formed of at least one monomer selected from the group consisting of an alkyl (meth)acrylate, styrene and a derivative thereof, acrylonitrile, vinyl acetate, and butadiene, polyethylene oxide, polypropylene oxide, or polycaprolactone.

The polymerizable oligomer is preferably a polymerizable oligomer represented by the following formula (3).

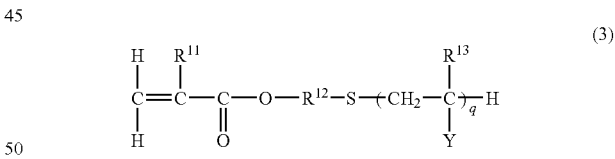

(3)

In formula (3), $R^{11}$ and $R^{13}$ each independently represent a hydrogen atom or a methyl group, $R^{12}$ represents an alkylene group having 1 to 12 carbon atoms (preferably, an alkylene group having 2 to 4 carbon atoms, which may have a substituent (for example, a hydroxyl group) and, further, may be bonded by way of an ester bond, ether bond, amide bond, etc.).

Y represents a phenyl group or a phenyl group having an alkyl group having 1 to 4 carbon atoms, or —COOR$^{14}$ in which R$^{14}$ represents an alkyl group having 1 to 6 carbon atoms, a phenyl group, or an aryl alkyl group having 7 to 10 carbon atoms. Y represents preferably a phenyl group or a —COOR$^{14}$ in which R$^{14}$ is an alkyl group having 1 to 12 carbon atoms.

q represents a number of 15 to 200, preferably 20 to 150, and more preferably 20 to 100.

Preferred examples of the polymerizable oligomer (macromonomer) include polymethyl(meth)acrylate, poly-n-butyl (meth)acrylate, and poly-iso-butyl(meth)acrylate, and a polymer in which a (meth)acryloyl group is bonded to one of terminal ends of the molecule of polystyrene. The polymerizable oligomer that is commercially available includes a polystyrene oligomer methacryloylated on one terminal end (Mn=6000, trade name: AS-6, manufactured by Toagosei Co., Ltd.), a polymethyl methacrylate oligomer methacryloylated at one terminal end (Mn=6000, trade name: AA-6, manufactured by Toagosei Co., Ltd.), and a poly-n-butyl acrylate oligomer methacryloylated at one terminal end (Mn=6000, trade name: AB-6, manufactured by Toagosei Co., Ltd.).

As the polymerizable olygomer, not only the polymerizable olygomer represented by formula (3) but also a polymerizable oligomer represented by the following formula (4) are preferred.

In a case of using polymerizable compounds together, it is particularly preferred to properly select the polymerizable oligomer in accordance with the polymerizable compound.

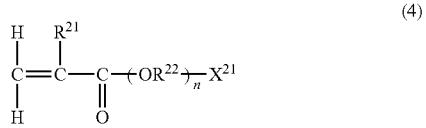

(4)

In formula (4), $R^{21}$ represents a hydrogen atom or a methyl group, and $R^{22}$ represents an alkylene group having 1 to 8 carbon atoms. $X^{21}$ represents —$OR^{23}$ or —$OCOR^{24}$. $R^{23}$ and $R^{24}$ represent a hydrogen atom, an alkyl group, or an aryl group. n represents 2 to 200.

$R^{21}$ represents a hydrogen atom or a methyl group.

$R^{22}$ represents an alkylene group having 1 to 8 carbon atoms and, among them, an alkylene group having 1 to 6 carbon atoms is preferred and an alkylene group having 2 to 3 carbon atoms is more preferred.

In a case where $X^{21}$ represents —$OR^{23}$, $R^{23}$ preferably represents a hydrogen atom, an alkyl group having 1 to 18 carbon atoms, a phenyl group, or a phenyl group substituted with an alkyl group having 1 to 18 carbon atoms. In a case where $X^{21}$ represents —$OCOR^{24}$, $R^{24}$ preferably represents an alkyl group having 1 to 18 carbon atoms.

n represents 2 to 200, preferably 5 to 150, and particularly preferably 10 to 100.

The polymerizable oligomer represented by formula (3) includes, for example, polyethylene glycol mono(meth)acrylate, polypropylene glycol mono(meth)acrylate, polyethylene glycol polypropylene glycol mono(meth)acrylate, and polytetramethylene glycol monomethacrylate, which may be commercial products or may be synthesized properly.

The polymerizable olygomer represented by formula (3) is also available as commercial products as described above. The commercial products include methoxy polyethylene glycol methacrylate (trade name; NK ESTER M-40G, M-90G, M-230G (manufactured by Shin-Nakamura Chemical Co., Ltd.), BLEMMER PME-100, PME-200, PME-400, PME-1000, PME-2000, and PME-4000 (manufactured by NOF Corporation), polyethylene glycol monomethacrylate (trade name: BLEMMER PE-90, PE-200, PE-350, manufactured by NOF Corporation, lauryloxy polyethylene glycol acrylate (trade name: BLEMMER ALE series, manufactured by NOF Corporation), polypropylene glycol monomethacrylate (trade name: BLEMMER PP-500, PP-800, PP-1000, manufactured by NOF Corporation), polyethylene glycol polypropylene glycol monomethacrylate (trade name: BLEMMER 70PEP-370B, manufactured by NOF corporation), polyethylene glycol polytetramethylene glycol monomethacrylate (trade name: BLEMMER 55-PET-800, manufactured by NOF corporation), polypropylene glycol polytetramethylene glycol monomethacrylate (trade name: BLEMMER NHK-5050, manufactured by NOF corporation).

The weight average molecular weight (Mw) in terms of polystyrene of the polymerizable oligomer is preferably from 500 to 20,000, and particularly preferably from 2,000 to 15,000.

The ratio of the repeating units derived from the polymerizable oligomer contained in the specific polymer is preferably from 40 to 96 mass %, more preferably from 50 to 90 mass %, and particularly preferably from 55 to 85 mass %. When the ratio of the repeating units derived from the polymerizable oligomer in the specific polymer is within the range described above, since the affinity to the liquid medium is good and the adsorption of the specific polymer to the pigment is more excellent, the viscosity of the pigment dispersion and that of the ink composition as an application form thereof can be suppressed effectively.

Specific examples of the polymerizable oligomer used preferably in the invention are to be shown below. The invention is not restricted to them.

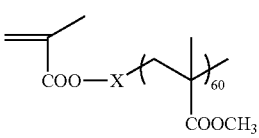

N-1

"AA-6" manufactured by Toagosei Co., Ltd. (structure described above, X: not disclosed)

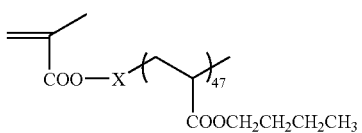

N-2

"AB-6" manufactured by Toagosei Co., Ltd. (structure described above, X: not disclosed)

N-3

"AX-707" manufactured by Toagosei Co., Ltd. (structure described above, X: not disclosed)

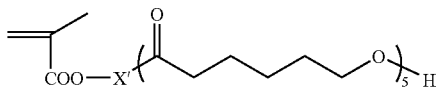

"PLACCEL FM5" manufactured by Daicel Chemical Industries, Ltd. (structure described above, X': not disclosed)

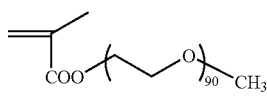

"BLEMMER PME-4000" manufactured by NOF Corporation

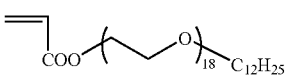

"BLEMMER ALE-800" manufactured by NOF Corporation

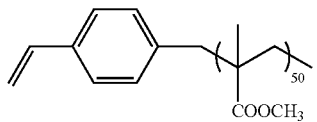

The specific polymer is also a copolymer of a monomer providing repeating units represented by formula (1) and formula (2), the polymerizable oligomer and other copolymerizable monomer as a preferred embodiment. Examples of other copolymerizable monomer include (meth)alkyl acrylate esters (for example, methyl(meth)acrylate, ethyl(meth)acrylate, n-butyl(meth)acrylate, and i-butyl(meth)acrylate, alkylaryl(meth)acrylate ester (for example, benzyl(meth)acrylate, phenoxyethyl(meth)acrylate, substituted alkyl (meth)acrylate ester (for example, glycidyl(meth)acrylate, 2-hydroxyethyl(meth)acrylate, dimethylaminoethyl(meth)acrylate), unsaturated carboxylic acids (for example, (meth)acrylic acid, crotonic acid, itaconic acid, maleic acid, and fumaric acid), aromatic vinyl compounds (for example, styrene, α-methylstyrene, vinyl toluene, 2-vinylpyridine, 4-vinylpyridine, and N-vinylimidazole), vinyl carboxylate ester (for example, vinyl acetate and vinyl propionate), vinyl cyanate (for example, (meth)acrylonitrile and α-chloroacrylonitrile), vinyl ether (cyclohexyl vinyl ether, 4-hydroxybutylvinyl, and aliphatic conjugated diene (for example, 1,3-butane diene, and isoprene). Among them, substituted alkyl(meth)acrylate ester, alkyl(meth)acrylate ester, alkylaryl(meth)acrylate ester are preferred.

In a case where the specific polymer has, repeating units derived from other polymerizable monomer described above in addition to the repeating unit represented by formula (1) and formula (2) and the repeating units derived from the polymerizable oligomer, it is preferred that the repeating units derived from the other monomer described above is contained in a range of from 5 to 30 mass % with respect to the entire repeating units contained in the specific polymer.

A preferred weight average molecular weight (Mw) of the specific polymer is from 10,000 to 500,000, and particularly from 15,000 to 200,000, from a view point of dispersion stability of the pigment and viscosity of the pigment dispersion. The weight average molecular weight (Mw) is a weight average molecular weight in term of polystyrene measured by gel permeation chromatography (carrier: N-methylpyrrolidone).

Examples of the graft copolymer as preferred embodiments of the specific polymer are shown below but the invention is not restricted to them.

P-1) Copolymer of Monomer A-2/Monomer M-1/Polymerizable oligomer N-1 (AA-6, manufactured by Toagosei Co., Ltd.) (15:15:70 mass ratio), weight average molecular weight: Mw=184,000

P-2) Copolymer of Monomer A-2/Monomer M-4/Polymerizable oligomer N-1 (AA-6, manufactured by Toagosei Co., Ltd.) (20:10:70 mass ratio), weight average molecular weight: Mw=86,000

P-3) Copolymer of Monomer A-2/Monomer M-4/Polymerizable oligomer N-2 (AB-6, manufactured by Toagosei Co., Ltd.) (10:10:80 mass ratio), weight average molecular weight: Mw=60,000

P-4) Copolymer of Monomer A-2/Monomer M-4/Polymerizable oligomer N-3 (AX-707, manufactured by Toagosei Co., Ltd.) (40:5:55 mass ratio), weight average molecular weight: Mw=320,000

P-5) Copolymer of Monomer A-2/Monomer M-4/Polymerizable oligomer N-5 (BLEMMER PME-4000, manufactured by NOF Corporation) (30:5:65 mass ratio), weight average molecular weight: Mw=106,000

P-6) Copolymer of Monomer A-2/Monomer M-6/Polymerizable oligomer N-3 (AX-707, manufactured by Toagosei Co., Ltd.) (10:20:70 mass ratio), weight average molecular weight: Mw=92,000

P-7) Copolymer of Monomer A-2/Monomer M-17/Polymerizable oligomer N-1 (AA-6, manufactured by Toagosei Co., Ltd.) (10:20:70 mass ratio), weight average molecular weight: Mw=36,000

P-8) Copolymer of Monomer A-2/Monomer M-17/Polymerizable oligomer N-2 (AB-6, manufactured by Toagosei Co., Ltd.) (10:15:75 mass ratio), weight average molecular weight: Mw=120,000

P-9) Copolymer of Monomer A-2/Monomer M-17/Polymerizable oligomer N-6 (BLEMMER ALE-800, manufactured by NOF Corporation) (10:20:70 mass ratio), weight average molecular weight: Mw=120,000

P-10) Copolymer of Monomer A-3/Monomer M-1/Polymerizable oligomer N-3 (AX-707, manufactured by Toagosei Co., Ltd.) (30:10:60 mass ratio), weight average molecular weight: Mw=110,000

P-11) Copolymer of Monomer A-3/Monomer M-4/Polymerizable oligomer N-1 (AA-6, manufactured by Toagosei Co., Ltd.) (40:10:50 mass ratio), weight average molecular weight: Mw=53,000

P-12) Copolymer of Monomer A-3/Monomer M-4/Polymerizable oligomer N-5 (BLEMMER PEM-4000, manufactured by NOF Corporation) (50:2:48 mass ratio), weight average molecular weight: Mw=194,000

P-13) Copolymer of Monomer A-3/Monomer M-6/Polymerizable oligomer N-1 (AA-6, manufactured by Toagosei Co., Ltd.) (20:10:70 mass ratio), weight average molecular weight: Mw=163,000

P-14) Copolymer of Monomer A-3/Monomer M-17/Polymerizable oligomer N-1 (AA-6, manufactured by Toagosei Co., Ltd.) (10:10:80 mass ratio), weight average molecular weight: Mw=230,000

P-15) Copolymer of Monomer A-3/Monomer M-17/Polymerizable oligomer N-4 (PLACCEL FM5, manufactured by Daicel Chemical Industries, Ltd.) (10:10:80 mass ratio), weight average molecular weight: Mw=232,000

P-16) Copolymer of Monomer A-3/Monomer M-17/Polymerizable oligomer N-5 (BLEMMER PEM-4000, manufactured by NOF Corporation) (5:5:90 mass ratio), weight average molecular weight: Mw=52,000

P-17) Copolymer of Monomer A-3/Monomer M-18/Polymerizable oligomer N-1 (AA-6, manufactured by Toagosei Co., Ltd.) (20:5:75 mass ratio), weight average molecular weight: Mw=98,000

P-18) Copolymer of Monomer A-5/Monomer M-13/Polymerizable oligomer N-1 (AA-6, manufactured by Toagosei Co., Ltd.) (5:35:60 mass ratio), weight average molecular weight: Mw=44,000

P-19) Copolymer of Monomer A-2/Monomer M-17/Polymerizable oligomer N-1 (AA-6, manufactured by Toagosei Co., Ltd.) methylmethacrylate (10:10:75:5 mass ratio), weight average molecular weight: Mw=82,000

P-20) Copolymer of Monomer A-2/Monomer M-17/Polymerizable oligomer N-1 (AA-6, manufactured by Toagosei Co., Ltd.) styrene (15:10:70:5 mass ratio), weight average molecular weight: Mw=110,000

P-21) Copolymer of Monomer A-3/Monomer M-10/Polymerizable oligomer N-2 (AB-6, manufactured by Toagosei Co., Ltd.) styrene (15:15:60:10 mass ratio), weight average molecular weight: Mw=54,000

The pigment dispersion of the invention may contain only one specific polymer, or two or more of polymers may be used together. The content of the specific polymer in the pigment dispersion is preferably from 1 to 100 mass %, and more preferably from 5 to 50 mass % with respect to the entire mass of the pigment.

1-2. Other Pigment Dispersing Agent

For the pigment dispersing agent of the invention, a known pigment dispersing agent may be used together in addition to the specific polymer so long as the effect of the invention is not impaired. The addition amount of the other pigment dispersing agent is preferably from 5 to 50 mass % with respect to the entire mass of the specific polymer. Further, a synergist may also be used optionally in accordance with various types of the pigment as a dispersion aid. The dispersion aid is added preferably from 1 to 30 mass % with respect to the entire mass of the pigment.

1-3. Polymerizable Compound

The pigment dispersion of the invention preferably contains a polymerizable compound. The polymerizable compound is not particularly restricted so long as it induces polymerizing reaction and causes curing by the application of any energy and can be used irrespective of the species of the monomer, the oligomer, and the polymer. Particularly, various types of known polymerizable monomers known as radically polymerizable monomers and cationically polymerizable monomer that induce polymerizing reaction by initiation species generated from a polymerization initiator added optionally are preferred. Among them, the radically polymerizable monomer and the cationically polymerizable monomer not containing an oxirane are more preferred from a view point of stability.

The polymerizable compounds may be used each alone or as a mixture of plurality of them with an aim of controlling the reaction rate, property of cured film, property of ink in a case of applying the pigment dispersion to an ink composition, etc. Further, the polymerizable compound may be a mono-functional compound or a poly-functional compound. When the ratio of the mono-functional compound is high, a cured product tends to be softened and, when the ratio of the poly-functional compound is high, the curability tends to become excellent. Accordingly, the ratio of the mono-functional compound and the poly-functional compound is optionally determined depending on the application use.

As the polymerizable compound, various types of known radically polymerizable monomers that induce the polymerizing reaction by starting species generated from a photoradical initiator can be used.

The radically polymerizable monomer includes, for example, (meth)acrylates, (meth)acrylamides, and aromatic vinyls. In the present specification, they are sometimes described as "(meth)acrylate" in a case of indicating one or both of "acrylate" and "methacrylate" and as "(meth)acryl" in a case of indicating one or both of "acryl" and "methacryl".

(Meth)acrylates used as the radically polymerizable monomer include, for example, mono-functional (meth)acrylate, bi-functional (meth)acrylate, tri-functional (meth)acrylate, tetra-functional (meth)acrylate, penta-functional (meth)acrylate, and hexa-functional (meth)acrylate.

The mono-functional (meth)acrylate includes, for example, hexyl (meth)acrylate, 2-ethylhexyl(meth)acrylate, tert-octyl(meth)acrylate, isoamyl(meth)acrylate, decyl (meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl(meth)acrylate, 2-echylhexyldiglycol(meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)acrylate, 3-methoxybutyl(meth)acrylate, alkoxymethyl(meth)acrylate, alkoxyethyl(meth)acrylate, 2-(2-methoxyethoxy)ethyl(meth)acrylate, 2-(2-butoxyethoxy)ethyl(meth)acrylate, 2,2,2-tetrafluoroethyl(meth) acrylate, 1H, 1H, 2H, 2H-perfluorodecyl(meth)acrylate, 4-butylphenyl(meth)acrylate, phenyl(meth)acrylate, 2,4,5-tetramethylphenyl(meth)acrylate, 4-chlorophenyl(meth) acrylate, phenoxymethyl(meth)acrylate, phenoxyethyl (meth)acrylate, glycidyl(meth)acrylate, glycidyloxybutyl (meth)acrylate, glycydiloxyethyl(meth)acrylate, glycydiloxypropyl(meth)acrylate, tetrahydrofurfuryl(meth) acrylate, hydroxyalkyl(meth)acrylate, 2-hydroxyethyl(meth) acrylate, 3-hydroxypropyl(meth)acrylate, 2-hydroxypropyl (meth)acrylate, 2-hydroxybutyl(meth)acrylate, 4-hydroxybutyl(meth)acrylate, 3-hydroxybutyl(meth)acrylate, dimethylaminoethyl(meth)acrylate, diethylaminoethyl (meth)acrylate, dimethylaminopropyl(meth)acrylate, diethylaminopropyl(meth)acrylate, trimethoxysilylpropyl(meth) acrylate, trimethylsilylpropyl(meth)acrylate, polyethylene oxide methyl ether (meth)acrylate, oligoethylene oxide monomethyl ether (meth)acrylate, polyethylene oxide (meth) acrylate, oligoethylene oxide (meth)acrylate, oligoethylene oxide monoalkyl ether (meth)acrylate, polyethylene oxide monoalkyl ether (meth)acrylate, dipropyleneglycol (meth) acrylate, polypropylene oxide monoalkyl ether (meth)acrylate, oligopropylene oxide monoalkyl ether (meth)acrylate, 2-methacryloyloxy ethyl succinic acid, 2-methacryloyloxy hexahydrophthalic acid, 2-methacryloyloxy ethyl-2-hydroxypropyl phthalate, butoxydiethylene glycol(meth)acrylate, trifluoroethyl(meth)acrylate, perfluorooctylethyl(meth)acrylate, 2-hydroxy-3-phenoxypropyl(meth)acrylate, EO modified phenol(meth)acrylate, EO modified cresol(meth)acrylate, EO modified nonylphenol(meth)acrylate, PO modified nonylphenol(meth)acrylate, EO modified-2-ethylhexyl (meth)acrylate, dicyclopentenyl(meth)acrylate, dicyclopentenyoxiethyl(meth)acrylate, dicyclopentanyl(meth)acrylate, (3-ethyl-3-oxetanylmethyl)(meth)acrylate, and phenoxyethyleneglycol(meth)acrylate.

Bi-functional (meth)acrylate includes, for example, 1,6-hexanediol di(meth)acrylate, 1,10-decanediol di(meth)acrylate, neopentylglycol di(meth)acrylate, 2,4-dimethyl-1,5-pentanediol di(meth)acrylate, butylethylpropanediol(meth)acrylate, ethoxylated cyclohexane methanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, neopentylglycol hydroxypivalate di(meth)acrylate, EO modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, dipropylene glycol di(meth)acrylate, and propoxylated neopentylglycol di(meth)acrylate.

The tri-functional (meth)acrylate includes, for example, trimethylolpropane tri(meth)acrylate, tirimethylolethene tri(meth)acrylate, alkylene oxide modified tri(meth)acrylate of trimethylolpropane, pentaerythritol tri(meth)acrylate, dipentaerythritol tri(meth)acrylate, trimethylolpropane tri((meth)acryloyloxipropyl)ether, isocyanuric acid alkylene oxide modified tri(meth)acrylate, propionic acid dipentaerythritol tri(meth)acrylate, tri((meth)acryloyloxyethyl) isocyanurate, hydroxyl pivalaldehyde modified dimethylol propane tri(meth)acrylate, sorbitol tri(meth)acrylate, propoxylated trimethylolpropane tri(meth)acrylate, and ethoxylated glycerin tri(meth)acrylate.

The tetra-functional (meth)acrylate includes, for example, penterythritol tetra(meth)acrylate, sorbitol tetra(meth)acrylate, ditrimethylolpropane tetra(meth)acrylate, dipentaerythritol propionate tetra(meth)acrylate, and ethoxylated pentaerythritol tetra(meth)acrylate.

The penta-functional (meth)acrylate includes, for example, sorbitol penta(meth)acrylate, and dipentaerythritol penta(meth)acrylate.

The hexa-functional (meth)acrylate includes, for example, dipentaerythritol hexa(meth)acrylate, sorbitol hexa(meth)acrylate, alkylene oxide modified hexa(meth)acrylate of phosphazene, and ε-caprolactone modified dipentaerythritol hexa(meth)acrylate.

The (meth)acrylamides used as the radically polymerizable monomer include, for example, (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth)acrylamide, N,N-dimethyl(meth)acrylamide, N,N-diethyl(meth)acrylamide, and (meth)acryloyl morpholine.

The aromatic vinyls used as the radically polymerizable monomer include, for example, styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinyl benzoate ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allystyrene, isopropenylstyrene, butenylstyrene, octenylstyrene, 4-t-butoxycarbonyl styrene, 4-methoxystyrene, and 4-t-butoxystyrene.

Further, the radically polymerizable monomer applicable in the invention includes, for example, vinyl esters (vinyl acetate, vinyl proipionate, vinyl versatate, etc.), allyl esters (allyl acetate, etc.), halogen containing monomers (vinylidene chloride, vinyl chloride, etc.), vinyl ethers (methyl vinyl ether, butyl vinyl ether, hexyl vinyl ether, methoxy vinyl ether, 2-ethylhexyl vinyl ether, methoxyethyl vinyl ether, cyclohexyl vinyl ether, chloroethyl vinyl ether, triethylene glycol divinyl ether, etc.), vinyl cyanate ((meth)acrylonitrile, etc,) and olefins (ethylene, propylene, etc.).

Among them, as the radically polymerizable monomer applicable in the invention, (meth)acrylates, and (meth)acrylamides are preferred from a view point of curing rate. From a view point of curing rate and viscosity of the pigment dispersion, it is preferred to use the poly-functional (meth)acrylate and the mono-functional or bi-functional (meth)acrylate and (meth)acrylamide described above together.

In the invention, the cationically polymerizable polymer may be used as the polymerizable compound. The cationically polymerizable monomer usable in the invention includes epoxy compounds, vinyl ether compounds, oxetane compounds, etc. described in each of the publications, for example, of JP-A Nos. 6-9714, 2001-31892, 2001-40068, 2001-55507, 2001-310938, 2001-310937, and 2001-220526. Among them, it is preferred to use the vinyl ether compound or oxetane from a view point of stability when a long time storage is necessary.

The mono-functional epoxy compound usable as the cationically polymerizable monomer includes, for example, phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethyl cyclohexyl oxide, 3-acryloyloxymethyl cyclohexene oxide, and 3-vinylcyclohexene oxide.

The poly-functional epoxy compound used as the cationically polymerizable monomer includes, for example, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxynovolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyhexylmethyl)adipate, vinylcyclohexane oxide, 4-vinylepoxycylohexane, bis(3,4-epoxy-6-methylcyclohexylmethyl)adipate, 3,4-epoxy-6-methylcyclohexyl-3'-4'-epoxy-6'-methylcyclohexane carboxylate, methylenebis(3,4-epoxycyclohexane), dicyclopentadiene diepoxide, di(3,4-epoxycyclohexylmethyl)ether of ethylene glycol, ethylenebis(3,4-epoxycyclohexane carboxylate), dioctyl epoxyhexahydrophthalate, di-2-ethylhexylepoxyhexahydro phthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, and 1,2,5,6-diepoxycylooctane.

Among the epoxy compounds described above, aromatic epoxides and alycyclic epoxides are preferred from a view point of excellent curing rate and, particularly, alicyclic epoxides are more preferred.

The mono-functional vinyl ether compound used as the cationically polymerizable monomer includes, for example, methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydrxybutyl vinyl ether, 4-hydroxymethyl cyclohexyl methyl vinyl ether, diethylene glycol monovinyl ether, polyethylene glycol vinyl ether, chloroethylvinyl ether, chlorobutyl vinyl ether, chloroethoxyethyl vinyl ether, phenylethyl vinyl ether, and phenoxypolyethylene glycol vinyl ether.

Further, the poly-functional vinyl ether compound used as the cationically polymerizable monomer includes, for example, divinyl ethers such as ethylene glycol divinyl ether, diethylene glycol divinyl ether, triethylene glycol divinyl ether, polyethylene glycol divinyl ether, propylene glycol divinyl ether, butylene glycol divinyl ether, hexadiol divinyl ether, bisphenol A alkylene oxide divinyl ether, and bisphenol F alkylene oxide divinyl ether; poly-functional vinyl ethers such as trimethylol ethane trivinyl ether, trimethylol propane trivinyl ether, ditrimethylol propane tetravinyl ether, glycerin trivinyl ether, pentaerythrithol tetravinyl ether, dipentaerythritol pentavinyl ether, dipentaerythritol hexavinyl ether, ethylene oxide added trimethylol propane trivinyl ether, propylene oxide added trimethylol propane trivinyl ether, ethylene oxide added ditrimethylol propane tetravinyl ether, propylene oxide added ditrimethylol propane tetravinyl ether, ethylene oxide added pentaerythritol tetravinyl ether, propylene oxide added pentaerythritol tetravinyl ether, ethylene oxide added dipentaerythritol hexavinyl ether, and propylene oxide added dipentaerythritol hexavinyl ether.

Among the poly-functional vinyl ether compounds described above, di- or tri-vinyl ether compounds are preferred from a view point of curability, adhesion with a medium to be recorded, and the surface hardness of formed cured products (for example, images) and, particularly, the divinyl ether compounds are more preferred.

The oxetane compound used as the cationically polymerizable monomer means compounds having an oxetane ring, and known oxetane compounds as described in each of the publications of JP-A Nos. 2001-220526, 2001-310937, 2003-341217 can be optionally selected and used. As the compound having the oxetane ring, a compound having the oxetane ring by the number of 1 to 4 in the structure is preferred. When such a compound is used, the viscosity of the ink composition can be maintained easily in a preferred range of the handlability and, further, a high adhesion of the ink after curing with a medium to be recorded can be obtained.

Examples of the mono-functional oxetane used as the cationically polymerizable monomer include, for example, 3-ethyl-3-hydroxymethyl oxetane, 3-(meth)allyloxymethyl-3-ethyl oxetane, (3-ethyl-3-oxetanylmethoxy)methyl benzene, 4-fluoro[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyldiethylene glycol(3-ethyl-3-oxetanylmethyl)ether, dicyclopentandiene(3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, and bornyl(3-ethyl-3-oxetanylmethyl)ether.

Examples of the poly-functional oxetane used as the cationically polymerizable monomer include, for example, 3,7-bis(3-oxetanyl)-5-oxanonane, 3,3'-(1,3-(2-methylenyl))propane diylbis(oxymethylene))bis-(3-ethyoxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanodiyldimethylene 3-ethyl-3-oxetanylmethyl)ether, trimethylolpropane tris (3-ethyl-3-oxetanylmethyl)ether, 1,4-bis(3-ethyl-3-oxetanylmethoxy) butane 1,6-bis(3-ethyl-3-oxetanylmethoxy) hexane, pentaerythritol tris(3-ethyl-3-oxetanylmethyl)ether, pentaarythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone modified dipentaerythritol hexakis(3-ethyl-3-oxetanylmethyl)ether, caprolactone modified dipentaerythritol pentakis(3-ethyl-3-oxetanylmethyl)ether, ditrimethylolpropane tetrakis (3-ethyl-3-oxetanylmethyl)ether, EO modified bisphenol A bis(3-ethyl-3-oxetanylmethyl)ether, PO modified bisphenol A bis(3-ethyl-3-oxetanylmethyl) ether, EO modified hydrogenated bisphenol A bis(3-ethyl-3-oxetanylmethyl)ether, PO modified hydrogenated bisphenol A bis(3-ethyl-3-oxetanylmethyl)ether, EO modified bisphenol F (3-ethyl-3-oxetanylmethyl)ether, and bis{[1-ethyl(3-oxetanyl]methyl}ether.

Such compounds having the oxetane ring are described specifically in paragraphs (0021) to (0084) of JP-A No. 2003-341217, and the compounds described therein can be used suitably also in the invention.

Among the oxetane compounds as the cationically polymerizable monomer, compounds having 1 to 2 oxetane rings are used preferably from a view point of viscosity and the adhesiveness of the pigment dispersion and the ink composition as the suitable embodiment thereof.

For the pigment dispersion of the invention and also for the ink composition as the suitable embodiment thereof, the compounds may be used each alone, or two or more of them may be used together as the cationically polymerizable monomer and it is preferred to use at least one oxetane compound and at least one compound selected from epoxy compounds and vinyl ether compounds in combination, from a view point of effectively suppressing the shrinkage of the cured products during curing.

The content of the polymerizable compound in a case where the pigment dispersion of the invention contains the polymerizable compound, with respect to the entire mass of the pigment dispersion is preferably from 50 to 95 mass %, and more preferably from 55 to 92 mass % from a view point of curability.

1-4. Dispersion Medium

The dispersion medium used upon dispersing various ingredients such as a pigment in the pigment dispersion of the invention can be selected optionally depending on the purpose. For example, a solvent may be used as the dispersion medium, or a polymerizable compound at a low viscosity may be used as the dispersion medium without using any solvent.

In a case of using a solvent as the dispersion medium, known alcohol type solvents, ester type solvents, ether type solvents, hydrocarbon type solvents, etc. are used preferably as the solvent. Specifically, alkylene oxide monoalkyl ether, alkylene oxide monoalkyl ether acetate, alkylene glycol diacetate, dialkyl dicarboxylate ester, (meth)acrylates, divinyl ethers, etc. are preferred.

In a case of applying the pigment dispersion to a colored curable composition such as an actinic energy ray-curable type ink composition, it is preferred that a volatile solvent is not contained, and it preferably uses a high boiling solvent having a boiling point of 180° C. or higher or uses no solvent. In such a case, it is also preferred to use the polymerizable compound as the dispersion medium.

2. Ink Composition

The ink composition of the invention is one of suitable embodiments of containing a polymerizable compound in the pigment dispersion of the invention and contains at least the pigment dispersion and (d) a polymerization initiator in which the concentration of the pigment is 1 to 10 mass %. The ink composition is an ink composition that can be cured by irradiation of actinic energy rays or by heating.

The ink composition of the invention is an ink composition suitable for inkjet recording in which the pigment is dispersed finely and which is excellent in the dispersion stability of the pigment even after long time storage or repetitive temperature change.

2-1. Pigment Dispersion

The ink composition of the invention can be obtained by preparing a pigment dispersion of the invention containing a polymerizable compound and adding at least a polymerization initiator to the pigment dispersion.

The ink composition of the invention is prepared by using a pigment dispersion in the form of containing the polymerizable compound among the pigment dispersions of the invention. Details for the types of each of the ingredients that can be contained in the pigment dispersion (pigment, specific polymer, polymerizable compound, etc.) and suitable embodiments thereof are as has been described specifically in the explanation for the pigment dispersion.

The concentration of the pigment in the ink composition of the invention is from 1 to 10 mass %, preferably from 1 to 9 mass %, and more preferably from 1.5 to 8.5 mass %. The concentration of the pigment in the ink composition can be set by controlling the amount of the pigment dispersion of the invention used upon preparation of the ink composition.

Further, the content of the specific polymer contained in the ink composition of the invention, with respect to the entire mass of the pigment, is preferably from 1 to 100 mass %, and more preferably from 5 to 50 mass %. In a case where it is less than the range described above, the dispersion stability is lowered and, in a case where it is more than the range described above, viscosity of the ink tends to be increased, which is not preferred.

Further, the content of the polymerizable compound contained in the ink composition of the invention, with respect to the entire mass of the ink composition is preferably from 60 to 95 mass %, and more preferably from 75 to 92 mass %, from a view point of curability.

2-2. Polymerization Initiator

The ink composition of the invention is prepared by adding a polymerization initiator to a pigment dispersion from a view point of improving the curing sensitivity.

The polymerization initiator used for the ink composition of the invention may be either a heat polymerization initiator or a photopolymerization initiator. When the heat polymerization initiator is contained, the ink composition shows good curability by heating. Further, when the photopolymerization initiator is contained, the ink composition is cured by the irradiation of actinic energy rays. In a case of forming images by using the ink composition of the invention, it is preferred to cure the ink composition instantaneously for obtaining sharp images. Accordingly, it is preferred to use the photopolymerization initiator as the polymerization initiator in the ink composition of the invention. Further, since the ink composition of the invention has a good dispersion stability of the pigment, it is one of the features thereof that the storage stability under the presence of the photopolymerization initiator is good.

Here, the actinic energy rays have no particular restriction so long as they can provide an energy capable of generating starting species by the irradiation in the ink composition and include, for example, α-rays, γ-rays, X-rays, UV-lights, visible lights, and electron beams. Among them, from a view point of curing sensitivity and easy availability of apparatus, UV-rays or electron beams are preferred, and UV-rays are more preferred. Accordingly, as the ink composition of the invention, those curable by the irradiation of UV-rays as the irradiation rays are preferred. As a light source for generating UV-rays, those having an emission wavelength at 300 nm to 400 nm are preferred, and low pressure mercury lamps, high pressure mercury lamps, short arc discharge lamps as known UV-rays lamps, UV-ray emission diodes, semiconductor lasers, and fluorescent lamps, etc. can be used. High pressure mercury lamps and metal halide lamps belonging to the high pressure discharge lamps and xenon lamps belonging to the short arc discharge lamps are used preferably depending on the amount of light and the wavelength suitable to the initiator. Further, UV-ray emission diodes are also used preferably from a view point of energy saving.

The ink composition of the invention preferably contains a polymerization initiator for radical polymerization, and more preferably contains a photopolymerization initiator.

2-3. Photopolymerization Initiator

The photopolymerization initiator is a compound causing chemical changes by the effect of light, or by way of interaction with an electron excited state of a sensitizing dye and forming at least one of radicals, acids, and basis.

A photopolymerization initiator having a sensitivity to irradiated actinic ray, for example, UV-ray at a wavelength of 400 nm to 200 nm, FUV-ray, g-line, h-line, i-line, KrF excimer laser light, ArF excimer laser light, electron beam, X-ray, molecular beam or ion beam can be selected and used optionally.

As the photopolymerization initiator, those known to a person skilled in the art can be used with no restriction and, for example, a number of initiators described in Chemical Revue, 93, 435 (1993), written by Bruce M. Monroe, et al, in Journal of Photochemistry and Biology A; Chemistry 73, 81 (1993), written by R. S. Davidson, in "Photoinitiated Polymerization-Theory and Applications", Rapra Review vol. 9, Report, Rapra Technology (1998), by J. P. Faussier, and in Prog, Polym. Sci., 21, 1 (1996), written by M. Tsunooka, et al. can be used. Further, compounds utilized for chemical amplification type photoresist or photocationic polymerization described in "Imaging Organic Material", edited by Organic Electronics Material Kenkyukai, from Bunshin Shuppan (1993) (refer to pages 187 to 192) can be used. Further, there have been known a group of compounds causing oxidative or reducing cleave of bonding by way of interaction with the electron excited state of a sensitizing dye as described, for example, in Topics in Current Chemistry, 156, 59 (1990), by F. D. Saeva, in Topics in Current Chemistry, 168, 1 (1993), by G. G. Maslak, in JACS, 112, 6329 (1999), by H. B. Shuster, et al, and in JACS, 102, 3298 (1980) by I. D. F. Eaton et al.

As the photopolymerization initiator, (i) aromatic ketones, (ii) aromatic onium salt compounds, (iii) organic peroxides, (iv) hexaryl biimidazole compounds, (v) ketoxime ester compounds, (vi) borate compounds, (vii) azinium compounds, (viii) metallocene compounds, (ix) active ester compounds, (x) compounds having carbon-halogen bonds are preferred.

(i) As the aromatic ketones, compounds having benzophenone skeleton or thioxantone skeleton described in "Radiation Curing in Polymer Science and Technology" (1993), p 77 to 117, by J. P. Fouassier, J. F. Rabek are preferred and, α-thibenzophenone compounds described in JP-B No. 47-6416, benzoin ether compounds described in JP-B No. 47-3981, α-substituted benzoin compounds described in JP-B No. 47-22326, benzoin derivatives described in JP-B No. 47-23664, aroyl phosphonic acid esters described in JP-A No. 57-30704, dialkoxy benzophenones described in JP-B No. 60-26483, benzoin ethers described in JP-B No. 60-26403, JP-A No. 62-81345, α-aminobenzophenones described in JP-B No. 1-34242, U.S. Pat. No. 4,318,791 and EP No. 0284561A1, p-di(dimethylaminobenzoyl)benzene described in JP-A No. 2-211452, thio-substituted aromatic ketones described in JP-A No. 61-194062, acyl phosphine oxides described in JP-A No. 58-15471, acyl phosphine sulfides described in JP-B No. 2-9597, acyl phosphines described in JP-B No. 2-9596, thioxantons described in JP-B No. 63-61950, coumarins described in JP-B No. 59-42864, monoacyl phosphine oxides described in JP-B Nos. 60-8047 and 63-40799, and bisacyl phosphine oxide described in JP-A Nos. 3-101686, 5-345790, and 6-298818 are preferred.

(ii) The aromatic onium salt includes aromatic onium salts of elements belonging to groups V, VI, and VII of the periodical table, specifically, N, P, As, Sb, Bi, O, S, Se Te, or I. For example, iodonium salts described in the specification of EP No. 104143, specification of U.S. Pat. No. 4,837,124, JP-A Nos. 2-150848 and 2-96514, sulfonium salts described in each of the specifications of EP Nos. 370693, 233567, 297443, 297442, 279210, and 422570, and each of the specifications of U.S. Pat. Nos. 3,902,144, 4,933,377, 4,760,013, 4,734,444, and 2,833,827, diazonium salts (benzodiazonium which may have a substituent, etc.), diazonium salt resins (formaldehyde resin of diazodiphenylamine, etc.), N-alkoxypyridinium salts (for example, those described in the specification of U.S. Pat. No. 4,743,528, JP-A Nos. 63-138345, 63-142345, and 63-142346, and JP-B No. 46-42363, specifically, 1-methoxy-4-phenyl pyridinium, tetrafluoroborate, etc.) and, further, compounds described each in JP-B Nos. 52-147277, 52-14278, and 52-14279 are used suitably. They generate radicals or acids as active species.

(iii) The organic peroxide includes almost of organic compounds having one or more oxygen-oxygen bond in the molecule and, for example, peroxy ester type compounds such as 3,3',4,4'-tetra-(t-butylperoxycarbonyl)benzophenone, 3,3',4, 4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, and di-t-butyldiperoxyisophthalate are preferred.

(iv) The hexaarylbiimidazole includes, for example, lophine dimers described in JP-B Nos. 45-37377 and 44-86516, for example, 2,2'-bis(o-chlorophenyl)-4,4',5,5'-tetraphenyl biimidazole, 2,2'-bis(o-bromophenyl)-4,4',5,5'-tetraphenyl biimidazole, 2,2'-bis(o,p-dichlorophenyl)-4,4',5, 5'-tetraphenyl biimidazole, 2,2'-bis(o-chlorophenyl)-4,4',5, 5'-tetra(m-methoxyphenyl) biimidazole, 2,2'-bis(o,o'-dichlorophenyl)-4,4',5,5'-tetraphenyl biimidazole, 2,2'-bis(o-nitrophenyl)-4,4',5,5'-tetraphenyl biimidazole, 2,2'-bis(o-methylphenyl)-4,4',5,5'-tetraphenyl biimidazole, and 2,2'-bis(o-trifluorophenyl)-4,4',5,5'-tetraphenyl biimidazole.

(v) The ketoxime ester includes, for example, 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenyl propan-1-one.

(vi) The borate salt includes, for example, compounds described in U.S. Pat. Nos. 3,567,453 and 4,343,891, and EP Nos. 109772 and 109773.

(vii) The azinium salt compound includes, for example, a group of compounds having an N-0 bond described in JP-A Nos. 63-138345, 63-142345, 63-142346, and 63-143537, and JP-B No. 46-42363.

(viii) The metallocene compound includes, for example, titanocene compounds described in JP-A Nos. 59-152396, 61-151197, 63-41484, 2-249, and 2-4705, and iron-arene complexes described in JP-A Nos. 1-304453 and 1-152109.

The titanocene compound includes, for example, di-cyclopentadienyl-Ti-di-chloride, di-cyclopentadienyl-Ti-bis-phenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-2,6-difluorophen-1-yl, di-cyclopentadienyl-Ti-2,4-difluorophen-1-yl, di-methylcyclopentadienyl-Ti-bis-2,3,4,5,6-pentafluorophen-1-yl, di-methylcyclopentadienyl-Ti-bis-2,3,5,6-tetrafluorophen-1-yl, di-methylcyclopentadienyl-Ti-bis-2,4-difluorophen-1-yl, bis(cyclopentadienyl)-bis(2,6-difluoro-3-(pyri-1-yl)phenyl) titanium, bis(cyclopentadienyl)bis[2,6[difluoro-3-(methylsulfoneamide) phenyl]titanium, and bis(cyclopentadienyl) bis[2,6-difluoro-3-(N-butylbiaroyl-amino)phenyl]titanium.

(ix) The active ester compound includes, for example, nitrobenzyl ester compounds described in each of the specification of EP Nos. 0290750, 046083, 156153, 271851, and 038834 and in each of the specifications of U.S. Pat. Nos. 3,901,710 and 4,181,531, and in each of JP-A Nos. 60-198538, 53-133022, iminosulfonate compounds described in each of the specifications of the EP Nos. 0199672, 84515, 199672, 044115, and 0101122, each of the specifications of U.S. Pat. Nos. 4,618,564, 4,371,605, and 4,431,774, and in each of JP-A Nos. 64-18143, 2-245756, and 4-365048, and compounds described in each of JP-B Nos. 62-6223 and 63-14340, and JP-A No. 59-174831.

(x) The compound having the carbon-halogen bond includes, for example, compounds described in Bull. Chem. Soc. Japan, 42, 2924 (1969), written by Wakabayashi, et al, compounds described in the specifications of GBP No. 1,388, 492, compounds described in JP-A No. 53-133428, and compounds described in the specification of GP No. 3,337,024.

(x) The compound having carbon-halogen bond further includes, for example, compounds described in J. Org. Chem., 29, 1527 (1964), by F. C. Schaefer, et al., compounds described in JP-A No. 62-58241, and compounds described in JP-A No. 5-281728. It also includes compounds as described in GP No. 2,641,100, compounds described in GP No. 3,333,450, a group of compounds described in GP No. 3,021,590, or a group of compounds described in GP No. 3,021,599.

At least one of the photopolymerization initiators is preferably a photopolymerization initiator selected from the group consisting of α-aminoacetophenone compounds, acyl phosphine oxide compounds, α-hydroxyacetophenone compounds, and oxime ester compounds.

[α-Aminoacetophenone Compound]

As the α-aminoacetophenone compound, compounds represented by the following formula (I) can be used preferably.

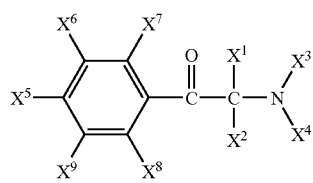
(I)

In formula (I), $X^1$ represents a group represented by the following formula (a), (b), or (c).

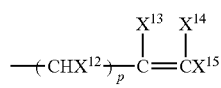
(a)

In formula (a), p is 0 or 1.

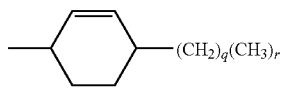
(b)

In formula (b), q is an integer of 0 to 3 and r is 0 or 1.

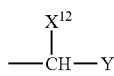
(c)

In formula (c), Y represents a hydrogen atom, a halogen atom, an OH group, an alkyl group having 1 to 12 carbon atoms (unless otherwise specified, the alkyl group means a linear or branched alkyl group here and hereinafter), an alkoxy group having 1 to 12 carbon atoms, an aromatic group, or a heterocyclic group. The aromatic group can preferably include a phenyl group or a naphthyl group. Further, the heterocyclic group can preferably include, for example, a furyl group, a thienyl group, or a pyridyl group.

The alkyl group, the alkoxy group, the aromatic group, and the heterocyclic group represented by Y may have a substituent.

The possible substituent for the alkyl group represented by Y may include an OH group, a halogen atom, $-N(X^{10})_2$ ($X^{10}$ represents a hydrogen atom, an alkyl group having 1 to 8 carbon atoms, an alkenyl group having 3 to 5 carbon atoms, a phenylalkyl group having 7 to 9 carbon atoms, a hydroxyalkyl group having 1 to 4 carbon atoms, or a phenyl group), an alkoxy group having 1 to 12 carbon atoms, —COOR(R represents an alkyl group having 1 to 18 carbon atoms), —CO($OCH_2CH_2)_nOCH_3$ (n represents an integer of 1 to 20), or —COOR(R represents an alkyl group having 1 to 4 carbon atoms).

The possible substituent for the alkoxy group represented by Y may include —COOR (R represents an alkyl group having 1 to 18 carbon atoms), or —CO($OCH_2CH_2)_nOCH_3$ (n represents an integer of 1 to 20).

The possible substituent for the aromatic group or the heterocyclic group represented by Y may include —($OCH_2CH_2)_nOH$ (n represents an integer of 1 to 20), —($OCH_2CH_2)_nOCH_3$ (n represents an integer of 1 to 20), an alkylthio group having 1 to 8 carbon atoms, a phenoxy group, —COOR (R represents an alkyl group having 1 to 18 carbon atoms), —CO($OCH_2CH_2)_nOCH_3$ (n represents an integer of 1 to 20), a phenyl group, or a benzyl group.

The substituents described above may be present by two or more if possible and the substituent may further be substituted if possible.

In formula, $X^{12}$ represents a hydrogen atom, an alkyl group having 1 to 8 carbon atoms, or a phenyl group. $X^{13}$, $X^{14}$, and $X^{15}$ each independently represent a hydrogen atom or an alkyl group having 1 to 4 carbon atoms. $X^{13}$ and $X^{14}$ may be crosslinked to form an alkylene group having 3 to 7 carbon atoms.

In formula, $X^2$ represents the same group as $X^1$, a cycloalkyl group having 5 or 6 carbon atoms, an alkyl group having 1 to 12 carbon atoms, or a phenyl group.

The alkyl and the phenyl group represented by $X^2$ may have a substituent.

The possible substituent for the alkyl group represented by $X^2$ may include an alkoxy group having 1 to 4 carbon atoms, a phenoxy group, a halogen atom, or a phenyl group.

The possible substituent for the phenyl group represented by $X^2$ may include a halogen atom, an alkyl group having 1 to 12 carbon atoms or an alkoxy group having 1 to 4 carbon atoms.

The substituents described above may be present by two or more if possible and the substituent may further be substituted if possible.

Further, $X^1$ and $X^2$ in the formula may be crosslinked to form a group represented by the following formula:

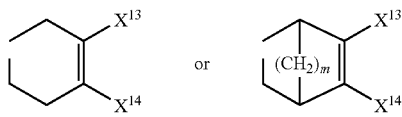

In the above formula m represents an integer of 1 to 3.

In the formula, $X^3$ represents a hydrogen atom, an alkyl group having 1 to 12 carbon atoms, an alkenyl group having 3 to 5 carbon atoms, a cycloalkyl group having 5 to 12 carbon atoms, or a phenylalkyl group having 7 to 9 carbon atoms.

The alkyl group, the alkenyl group, the cycloalkyl group, and the phenylalkyl group represented by $X^3$ may have a substituent, and the substituent includes an OH group, an alkoxy group having 1 to 4 carbon atoms, —CN, or —COOR (R represents an alkyl group having 1 to 4 carbon atoms).

In the formula, $X^4$ represents an alkyl group having 1 to 12 carbon atoms, an alkenyl group having 3 to 5 carbon atoms, a cycloalkyl group having 5 to 12 carbon atoms, a phenyl alkyl group having 7 to 9 carbon atoms, or a phenyl group.

The alkyl group, the alkenyl group, the cycloalkyl group, the phenylalkyl group, and the phenyl group represented by $X^4$ may have a substituent.

The possible substituent for the alkyl group, the alkenyl group, the cycloalkyl group, and the phenylalkyl group represented by $X^4$ may include an OH group, an alkoxyl group having 1 to 4 carbon atoms, —CN, or —COOR (R represents an alkyl group having 1 to 4 carbon atoms). Further, in a case where the alkyl group represented by $X^4$ has a substituent, the number of carbon atoms of the alkyl group to be substituted is preferably 2 to 4.

The possible substituent for the phenyl group represented by $X^4$ may include a halogen atom, an alkyl group having 1 to 12 carbon atoms, an alkoxy group having 1 to 4 carbon atoms, or —COOR (R represents an alkyl group having 1 to 4 carbon atoms).

Here, $X^2$ and $X^4$ may be crosslinked to form an alkylene group having 1 to 7 carbon atoms, a phenylalkylene group having 7 to 10 carbon atoms, an o-xylylene group, a 2-butenylene group or an oxa- or an aza-alkylene group having 2 or 3 carbon atoms.

Further, $X^3$ and $X^4$ may be crosslinked to form an alkylene group having 3 to 7 carbon atoms.

The alkylene group formed by crosslinking of $X^3$ and $X^4$ may have, as a substituent, an OH group, an alkoxy group having 1 to 4 carbon atoms, or —COOR (R represents an alkyl group having 1 to 4 carbon atoms), or may be intervened in the bonding chain thereof by —O—, —S—, —CO—, or —N($X^{16}$)— ($X^{16}$ represents a hydrogen atom, an alkyl group having 1 to 12 carbon atoms, or one or more —O—, an alkenyl group having 3 to 5 carbon atoms, a phenylalkyl group having 7 to 9 carbon atoms, a hydroxyalkyl group having 1 to 4 carbon atoms, —CH$_2$CH$_2$CN, —CH$_2$CH$_2$COOR (R represents an alkyl group having 1 to 4 carbon atoms), or an alkyl group having 1 to 12 carbon atoms intervened in the bonding chain thereof by an alkanoyl group having 2 to 8 carbon atoms or benzoyl group).

In the formula $X^5$, $X^6$, $X^7$, $X^8$, and $X^9$ each independently represent a hydrogen atom, a halogen atom, an alkyl group having 1 to 12 carbon atoms, a cycloalkyl group having 5 or 6 carbon atoms, a phenyl group, a benzyl group, a benzoyl group, a —O$X^{17}$ group, an —S$X^{18}$ group, a —SO—$X^{18}$ group, a —SO$_2$—$X^{18}$ group, a —N($X^{19}$)($X^{20}$) group, an —NH—SO$_2$$X^{21}$ group, or the group represented by the following formula:

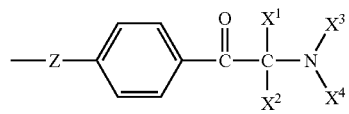

In the formula, Z represents —O—, —S—, —N($X^{10}$)—$X^{11}$—N($X^{10}$)— or a group represented by the following formula. $X^1$, $X^2$, $X^3$, and $X^4$ are identical with $X^1$, $X^2$, $X^3$, and $X^4$ in formula (I).

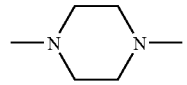

In the formula, $X^{10}$ has the same meanings as described above and $X^{11}$ represents a linear or branched alkylene group having 2 to 16 carbon atoms, or a linear or branched alkylene group having 2 to 16 carbon atoms which is intervened in the chain thereof by one or more —O—, —S—, or —N($X^{10}$)— ($X^{10}$ has the same meanings as described above).

$X^{17}$ represents a hydrogen atom, an alkyl group having 1 to 12 carbon atoms, —(CH$_2$CH$_2$)$_n$H (n is an integer of 2 or greater and 20 or less), an alkanoyl group having 2 to 8 carbon atoms, an alkenyl group having 3 to 12 carbon atoms, a cyclohexyl group, a hydrocyclohexyl group, a phenyl group, a phenyl alkyl group having 7 to 9 carbon atoms, or —Si(R$^4$)$_r$(R$^5$)$_{3-r}$ (R$^4$ represents an alkyl group having 1 to 8 carbon atoms and R$^5$ represents a phenyl group, and r is 1, 2, or 3).

The alkyl group and the phenyl group represented by $X^{17}$ may have a substituent.

The possible substituent for the alkyl group represented by $X^{17}$ may include —CN, —OH, an alkoxy group having 1 to 4 carbon atoms, an alkenyloxy group having 3 to 6 carbon atoms, —OCH$_2$CH$_2$CN, —CH$_2$CH$_2$COOR (R represents an alkyl group having 1 to 4 carbon atoms), —COOH, or —COOR (R represents an alkyl group having 1 to 4 carbon atoms). Further, in a case where the alkyl group in $X^{17}$ has a substituent, the number of carbon atoms of the alkyl group to be substituted is preferably 1 or greater and 6 or less.

The possible substituent for the phenyl group represented by $X^{17}$ may include a halogen atom, an alkyl group having 1 to 12 carbon atoms, or an alkoxy group having 1 to 4 carbon atoms.

$X^{18}$ represents a hydrogen atom, an alkyl group having 1 to 12 carbon atoms, an alkenyl group having 3 to 12 carbon atoms, a cyclohexyl group, a phenyl group, or a phenylalkyl group having 7 to 9 carbon atoms.

The alkyl group and the phenyl group represented by $X^{18}$ may have a substituent.

The possible substituent for the alkyl group represented by $X^{18}$ may include —SH, —OH, —CN, —COOR (R represents an alkyl group having 1 to 4 carbon atoms), an alkoxy group having 1 to 4 carbon atoms, —OCH$_2$CH$_2$CN, or —OCH$_2$CH$_2$COOR (R represents an alkyl of 1 to 4 carbon atoms).

The possible substituent for the phenyl group represented by $X^{18}$ may include a halogen atom, an alkyl group having 1 to 12 carbon atoms, or an alkoxy group having 1 to 4 carbon atoms.

$X^{19}$ and $X^{20}$ each independently represent a hydrogen atom, an alkyl group having 1 to 12 carbon atoms, a hydroxyalkyl group having 2 to 4 carbon atoms, an alkoxyalkyl group having 2 to 10 carbon atoms, an alkenyl group having 3 to 5 carbon atoms, a cycloalkyl group having 5 to 12 carbon atoms, a phenylalkyl group having 7 to 9 carbon atoms, a phenyl group, a halogen atom, a phenyl group substituted by an alkyl group having 1 to 12 carbon atoms, or an alkoxy group having 1 to 4 carbon atoms, an alkanoyl group having 2 or 3 carbon atoms, or a benzoyl group. Further, $X^{19}$ and $X^{20}$ may be crosslinked to form an alkylene group having 2 to 8 carbon atoms, an alkylene group having 2 to 8 carbon atoms substituted by an OH group, an alkoxy group having 1 to 4 carbon atoms, or —COOR(R represents an alkyl group having 1 to 4 carbon atoms), or an alkylene group having 2 to 8 carbon atoms intervened in the bonding chain thereof by —O—, —S—, or —N($X^{16}$)— ($X^{16}$ has the same meanings as described above).

$X^{21}$ represents an alkyl group having 1 to 18 carbon atoms; a phenyl group; a naphthyl group: or a phenyl group or a naphthyl group substituted by a halogen atom, an alkyl group having 1 to 12 carbon atoms, or an alkoxy group having 1 to 8 carbon atoms.

The compound represented by formula (I) is more preferably a compound represented by the following formula (d).

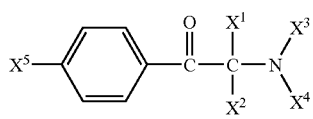

In formula (d), $X^1$ and $X^2$ each independently represent a methyl group, an ethyl group, or a benzyl group, —$NX^3X^4$ represents a dimethylamino group, a diethylamino group, or a morpholino group, $X^5$ represents a hydrogen atom, an alkyl group having 1 to 8 carbon atoms, an alkoxy group having 1 to 8 carbon atoms, an alkylthio group having 1 to 8 carbon atoms, a dimethylamino group, or a morpholino group. Among them, —$NX^3X^4$ is more preferably the dimethylamino group, or the morpholino group.

Further, as the α-aminoacetophenone compound, an acid addition salt of a compound represented by formula (1) can also be used.

Further, the commercial α-aminoacetophenone compound includes, for example, polymerization initiators available from Ciba Specialty Chemicals Ltd. under the trade names of IRGACURE 907, IRGACURE 369, and IRGACURE 379.

As the α-aminoacetophenone compounds, specifically, the following compounds can be shown as examples.

For example, they include; 2-dimethylamino-2-methyl-1-phenylpropan-1-one, 2-diethylamino-2-methyl-1-phenylpropan-1-one, 2-methylamino-2-morpholino-1-phenylpropan-1-one, 2-dimethylamino-2-methyl-1-(4-methylphenyl)propan-1-one, 2-dimethylamino-1-(4-ethylphenyl)-2-methylpropan-1-one, 2-dimethylamino-1-(4-isopropylphenyl)-2-methylpropan-1-one, 1-(4-butylphenyl)-2-dimethylamino-2-methylpropan-1-one, 2-dimethylamino-1-(4-methoxyphenyl)-2-methylpropan-1-one, 2-dimethylamino-2-methyl-1-(4-methylthiophenyl)propan-1-one, 2-methyl-1-(4-methylthiophenyl)-2-morpholinopropan-1-one (IRGACURE 907), 2-benzyl-2-dimethylamino-1-(4-morpholinophenyl)-butan-1-one (IRGACURE 369), 2-benzyl-2-dimethylamino-1-(4-dimentylaminophenyl)-butan-1-one, and 2-dimethylamino-2-[(4-methylphenyl)methyl]-1-[4-(4-morpholinyl)phenyl]-1-butanone (IRGACURE 379).

[Acylphosphine Oxide Compound]

The acylphosphine oxide compound is preferably a compound represented by the following formula (II) or the following formula (III).

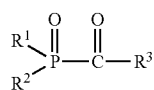

In formula (II), $R^1$ and $R^2$ each independently represent an aliphatic group, an aromatic group, an aliphatic oxy group, an aromatic oxy group, or a heterocyclic group, $R^3$ represents an aliphatic group, an aromatic group, or a heterocyclic ring group. $R^1$ and $R^2$ may be bonded to form a 5-membered ring or a 9-membered ring. The ring structure may be a heterocyclic having an oxygen atom, a nitrogen atom, a sulfur atom, etc. in the ring structure.

In formula (II), the aliphatic group represented by $R^1$, $R^2$ or $R^3$ includes, for example, an alkyl group, a substituted alkyl group, an alkenyl group, a substituted alkenyl group, an alkynyl group, a substituted alkynyl group, an aralkyl group, or a substituted aralkyl group. Among them, the alkyl group, the substituted alkyl group, the alkenyl group, the substituted alkenyl group, the aralkyl group, or the substituted aralkyl group is preferred, and the alkyl group or the substituted alkyl group is particularly preferred. Further, the aliphatic group may be a cycloaliphatic group or a linear aliphatic group. The linear aliphatic group may have a branch.

The alkyl group includes, linear, branched, or cyclic alkyl groups and the number of carbon atoms in the alkyl group is preferably 1 or more and 30 or less, and more preferably 1 or more and 20 or less. A preferred range for the number of carbon atoms in the alkyl moiety of the substituted alkyl group is identical with that for the case of the alkyl group. The alkyl group includes a methyl group, an ethyl group, a propyl group, a butyl group, a pentyl group, a hexyl group, an octyl group, a 2-ethylhexyl group, a decyl group, a dodecyl group, octadecyl group, cyclohexyl group, cyclopentyl group, neopentyl group, an isopropyl group, and an isobutyl group.

The substituent for the substituted alkyl group includes, for example, —COOH (carboxyl group), —$SO_3H$ (sulfo group), —CN (cyano group), halogen atom (for example, fluorine atom, chlorine atom, bromine atom), —OH (hydroxyl group), an alkoxy carbonyl group having 30 or less carbon atoms (for example, methoxy carbonyl group, ethoxy carbonyl group, benzyloxy carbonyl group), an alkylsulfonylamino carbonyl group, an arylsulfonylamino carbonyl group, an alkylsulfonyl group, an arylsulfonyl group having 30 or less of carbon atoms, an acylaminosulfonyl group having 30 or less carbon atoms, an alkoxy group having 30 or less carbon atoms (for example, methoxy group, ethoxy group, benzyloxy group, phenoxyethoxy group, and phenetyloxy group), alkylthio group having 30 or less carbon atoms (for example, methylthio group, ethylthio group, and methylthioethylthio ethyl group), an aryloxy group having 30 or less carbon atoms (for example, phenoxy group, p-tolyloxy group, 1-naphthoxy group, and 2-naphthoxy group), a nitro group, an alkoxycarbonyloxy group, an aryloxy carbonyloxy group, an acyloxy group having 30 or less carbon atoms (for example, acetyloxy group, and propionyloxy group), an acyl group having 30 or less carbon atoms (for example, acetyl group, propionyl group, and benzoyl group), a carbamoyl group (for example, carbamoyl group, N,N-dimethyl carbamoyl group, morpholino carbonyl group, and pipelidino carbonyl group), a sulfamoyl group (for example, sulfamoyl group, N,N-dimethyl sulfamoyl group, morpholino sulfonyl group, pipelidino sulfonyl group), an aryl group having 30 or less carbon atoms (for example, phenyl group, 4-chloropyenyl group, 4-methylphenyl group, and a-naphthyl group), a substituted amino group (for example, amino group, alkylamino group, dialkylamino group, arylamino group, diarylamino group, and acylamino group), a substituted ureido group, a substituted phosphono group, and heterocyclic group. In this case, the carboxyl group, the sulfo group, the hydroxyl group and the phosphono group may be in the form of a salt. In this case, the cation forming the salt is a group capable of forming a cation, and organic cationic compounds, transition metal coordination complex cations (compounds described in JP No. 2,791,143, etc.) or metal cations for example, $Na^+$, $K^+$, $Li^+$, $Ag^+$, $Fe^{2+}$, $Fe^{3+}$, $Cu^+$, $Cu^{2+}$, $Zn^{2+}$, $Al^{3+}$) are preferred.

The alkenyl group includes linear, branched and cyclic alkenyl groups and the number of carbon atoms of the alkenyl group is preferably 2 or more and 30 or less, and more preferably 2 or more and 20 or less. Further, the alkenyl group may be either a substituted alkenyl group having a substituent or a not substituted alkenyl group, and a preferred range for number of carbon atoms in the alkenyl moiety of the substituted alkenyl group is identical with that for the case of the alkenyl group. The substituent for the substituted alkenyl group includes the same substituent as in the case of the substituted alkyl group.

The alkynyl group includes linear, branched and cyclic alkynyl groups and the number of carbon atoms of the alkynyl group is preferably 2 or more and 30 or less, and more preferably 2 or more and 20 or less. Further, the alkynyl group may be either a substituted alkyl group having a substituent or a not-substituted alkynyl group, and a preferred range for the number of carbon atoms in the alkynyl moiety of the substituted alkynyl group is identical with that in the case of the alkynyl group. The substituent for the substituted alkynyl group includes the same substituents as those in the case of the substituted alkyl group.

The aralkyl group includes linear, branched and cyclic aralkyl groups having alkyl side chains, and the number of carbon atoms of the aralky group is preferably 7 or more and 35 or less, and more preferably 7 or more and 25 or less. Further, the aralkyl group may be either a substituted aralkyl group having a substituent or a not-substituted aralkyl group and a preferred range for the number of carbon atoms for the aralkyl moiety of the substituted aralkyl group is identical with that in the case of the aralkyl group. The substituent for the substituted aralkyl group includes the same substituent as that in the case of the substituted alkyl group. Further, the aryl moiety of the aralkyl group may have a substituent and the substituent includes, for example, the same substituent as that for the alkyl group and linear, branched and cyclic alkyl groups having 30 or less carbon atoms.

In formula (II), the aromatic group represented by $R^1$, $R^2$, or $R^3$ includes, for example, an aryl group or a substituted aryl group. The number of carbon atoms of the aryl group is preferably 6 or more and 30 or less, and more preferably 6 or more and 20 or less. A preferred range for the number of carbon atoms in the aryl moiety of the substituted aryl group is identical with that for the aryl group. The aryl group includes, for example, a phenyl group, an α-naphthyl group, and a β-naphthyl group. The substituent for the substituted aryl group includes the same substituent as that in the case of the substituted alkyl group and linear, branched, or cyclic alkyl groups having 30 and less carbon atoms.

In formula (II), as the aliphatic oxy group represented by $R^1$ or $R^2$, an alkoxy group having 1 or more and 30 or less carbon atoms is preferred and includes, for example, a methoxy group, an ethoxy group, a butoxy group, an octyloxy group, and a phenoxyethoxy group. However they are not restrictive.

In formula (II), as the aromatic oxy group represented by $R^1$ or $R^2$, an aryloxy group having 6 or more and 30 or less carbon atoms is preferred and includes, for example, a phenoxy group, a methylphenyloxy group, a chlorophenyloxy group, a methoxyphenyloxy group, and an octyloxyphenyloxy group. However they are not restrictive.

In formula (II), as the heterocyclic group represented by $R^1$, $R^2$, or $R^3$ is preferably a heterocyclic group containing an N, O, or S atom and includes, for example, a pyridyl group, a furyl group, a thienyl group, an imidazolyl group, and a pyrrolyl group.

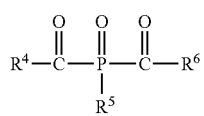
(III)

In formula (III), $R^4$ and $R^6$ each independently represent an alkyl group, an aryl group, or a heterocyclic group, and $R^5$ represents an alkyl group, an aryl group, an alkoxy group, an aryloxy group, or a heterocyclic group.

In formula (III), the alkyl group, the aryl group, the heterocyclic group, and the alkoxy group, and arylxoy group represented by $R^4$, $R^5$, or $R^6$ may have a substituent and the substituent includes the same substituents as those in the case of formula (II).

The alkyl group, the aryl group, the heterocyclic group, the alkoxy group, and the aryloxy group in formula (III) have the same meanings as in formula (II).

The compound represented by formula (II) is more preferably a compound represented by the following formula (IV).

(IV)

In formula (IV), $R^7$ and $R^8$ represent each independent a phenyl group, a methoxy group or an isopropoxy group, $R^9$ represents a 2,4,6-trimethylphenyl group, a 2,4-dimethylphenyl group, a 2-methylphenyl group (o-toluoyl group), an isobutyl group, or a t-butyl group.

The compound represented by formula (III) is more preferably a compound represented by the following formula (V).

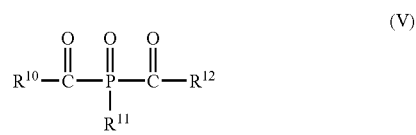
(V)

In formula (V), $R^{10}$ and $R^{12}$ each independently represent, a 2,4,6-trimethylphenyl group, a 2,6-dimethylphenyl group, or 2,6-dimethoxyphenyl group, and $R^{11}$ represents a phenyl group or a 2,4,4-trimethylpentyl group.

The acylphosphine oxide compound represented by formula (II) or (III) includes, for example, those compounds described in JP-B Nos. 63-40799, 5-29234, and JP-A Nos. 10-95788, and 10-29997.

Specific examples of the acylphosphine oxide compound include the compound shown below (exemplified compounds (P-1) to (P-26)) but the invention is not restricted to them.

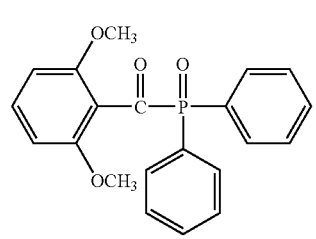
(P-1)

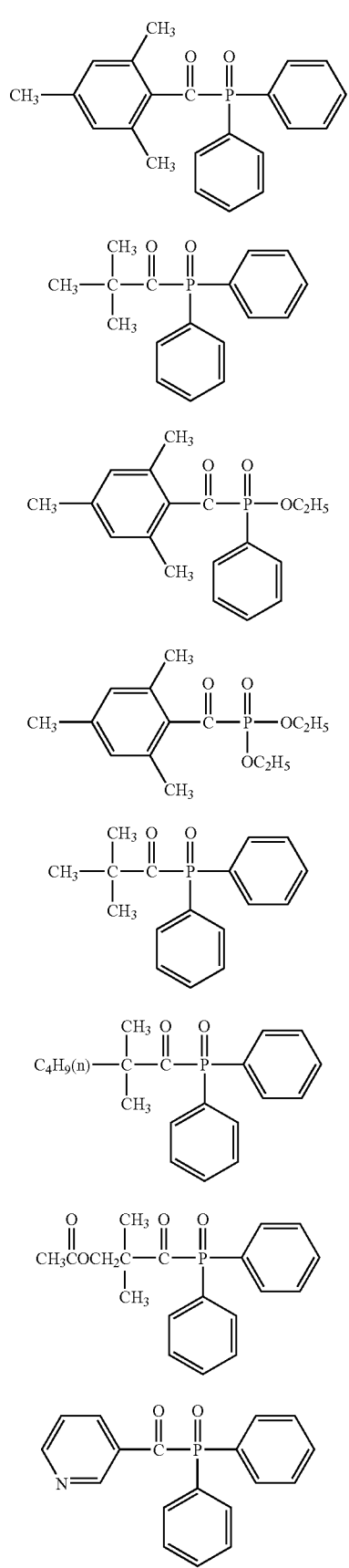
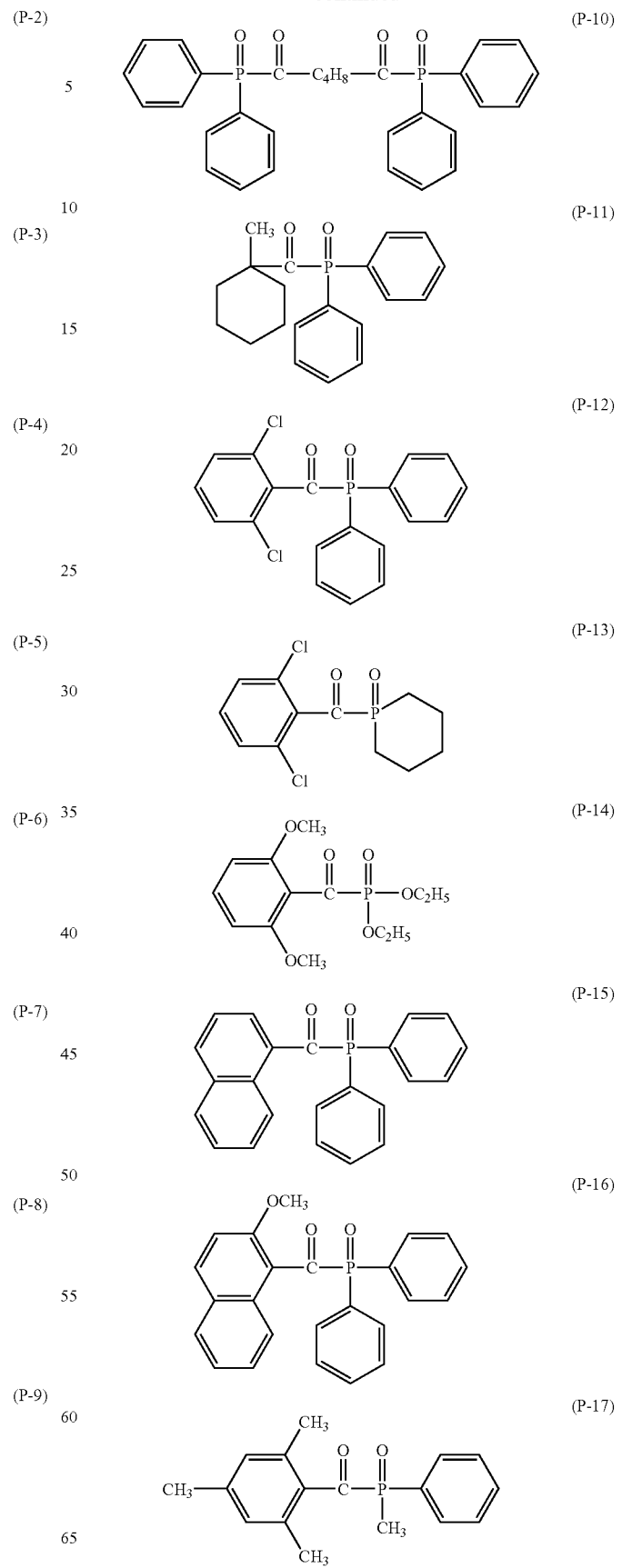

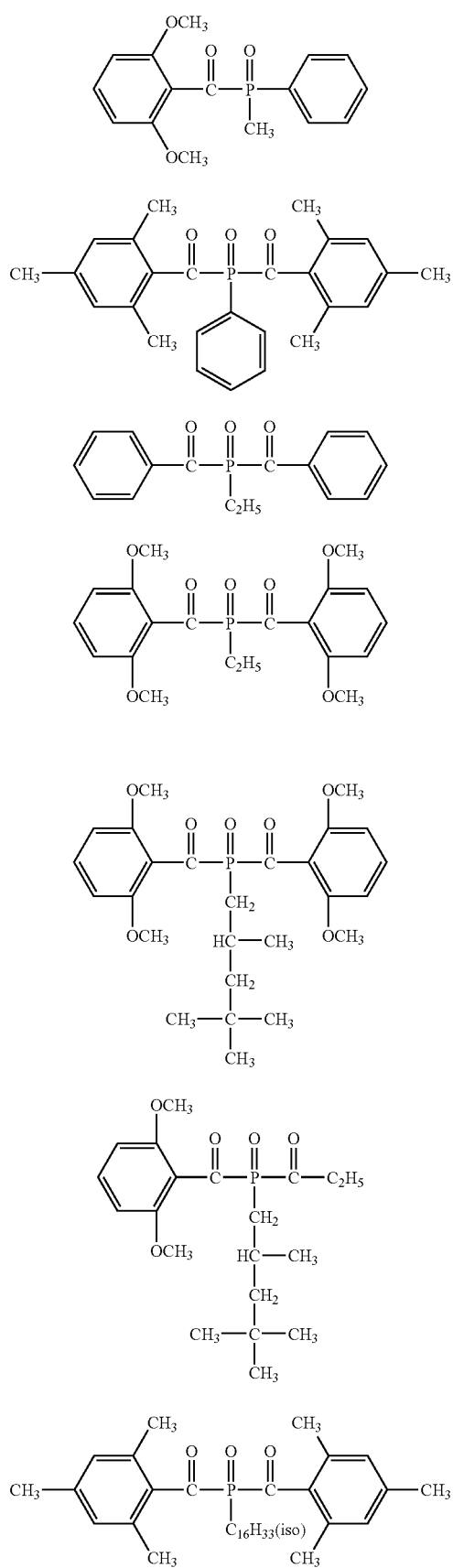

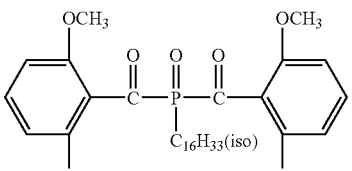

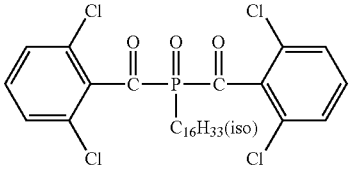

As the acylphosphine oxide compound, monoacylphosphine oxide compounds and bisacylphosphine oxide compounds, etc. can be used and, as the monoacylphosphine oxide compound, known monoacylphosphine oxide compounds can be used. They include, for example, monoacylphosphine oxide compounds described in JP-B Nos. 60-8047 and 63-40799. Specific examples thereof include: methyl isobutylyl-methyl phosphinate ester, methyl isobutylyl-phenyl phosphinate ester, methyl pivaloyl-phenyl phosphinate ester, methyl 2-ethylhexanoyl-phenyl phosphinate ester, isopropyl pivaloyl-phenyl phosphinate ester, methyl p-toluoyl-phenyl phosphinate ester, methyl o-toluoyl-phenyl phosphinate ester, methyl-2,4-dimethylbenzoyl-phenyl phosphinate ester, isopropyl p-tertiary butylbenzoyl-phenyl phosphinate ester, methyl acryloyl-phenyl phosphinate ester, isobutylyl-diphenyl phosphine oxide, 2-ethylhexanoyl-diphenyl phosphine oxide, o-toluoyl-diphenyl phosphine oxide, p-tertiary butylbenzoyl-diphenyl phosphine oxide, 3-pyridylcarbonyl-diphenyl phosphine oxide, acryloyl-diphenyl phosphine oxide, benzoyl-diphenyl phosphine oxide, vinyl pivaroyl-phenyl phosphinate ester, azipoyl-bis-diphenyl phosphine oxide, pivaroyl-diphenyl phosphine oxide, p-toluoyl-diphenyl phosphine oxide, 4-(tertiary butyl)-benzoyl-diphenyl phosphine oxide, 2-methylbenzoyl-diphenyl phosphine oxide, 2-methyl-2-ethylhexanoyl-diphenyl phosphine oxide, 1-methyl-cyclohexanoyl-diphenyl phosphine oxide, methyl pivaroyl-phenyl phosphinate ester, and isopropyl pivaroyl-phenyl phosphinate ester.

As the bisacylphosphine oxide compound, known bisacylphosphine oxide compounds can be used. They include, for example, bisacylphosphine oxide compounds described in JP-A Nos. 3-101686, 5-345790, and 6-298818. Specific examples include, for example, bis(2,6-dichlorobenzoyl)-phenyl phosphine oxide, bis(2,6-dichlorobenzoyl)-2,5-dimethylphenyl phosphine oxide, bis(2,6-dichlorobenzoyl)-4-ethoxyphenyl phosphine oxide, bis(2,6-dichlorobenzoyl)-4-propylphenyl phosphine oxide, bis(2,6-dichlorobenzoyl)-2-naphthyl phosphine oxide, bis(2,6-dichlorobenzoyl)-1-naphthyl phosphine oxide, bis(2,6-dichlorobenzoyl)-4-chlorophenyl phosphine oxide, bis(2,6-dichlorobenzoyl)-2,4-dimethoxyphenyl phosphine oxide, bis(2,6-dichlotobenzoyl)-decyl phosphine oxide, bis(2,6-dichlorobenzoyl)-4-octylphenyl phosphine oxide, bis(2,4,6-trimethylbenzoyl)-phenyl phosphine oxide, bis(2,4,6-trimethylbenzoyl)-2,5-dimethylphenyl phosphine oxide, bis(2,6-dichloro-3,4,5-trimethoxybenzoyl)-2,5-dimethylphenyl phosphine oxide, bis(2,6-dichloro-3,4,5-trimethoxybenzoyl)-4-ethoxyphenyl phosphine oxide, bis(2-methyl-1-naphthoyl)-2,5-dimethylphenyl phosphine oxide, bis(2-methyl-1-naphthoyl)-4-ethoxyphenyl phosphine oxide, bis(2-methyl-1-naphthoyl)-2-naphthyl phosphine oxide, bis(2-methyl-1-naphthoyl)-4-propylphenyl phosphine oxide, bis(2-methyl-1-naphthoyl)-2,5-dimethylphenyl phosphine oxide, bis(2-methyl-2-naphthoyl)-4-ethoxyphenyl phosphine oxide, bis(2-chloro-1-naphthoyl)-2,5-dimethylphenyl phosphine oxide, and bis(2,6-dimethoxybenzoyl)-2,4,4-trimethylpentyl phosphine oxide.

Among them, as the acyl phosphine oxide compound in the invention, bis(2,4,6-trimethylbenzyl)-phenyl phosphine oxide (IRGACURE 819: manufactured by Ciba Specialty Chemicals), bis(2,6-diethoxybenzoyl)-2,4,4-trimethyl-pentylphenyl phosphine oxide, 2,4,6-trimethylbenzoyl-diphenyl phosphine oxide (DAROCUR TPO, manufactured by Ciba Specialty Chemicals Co., LUCIRIN TPO: manufactured by BASF Co.) are preferred.

[α-Hydroxyacetophenone Compound]

The α-hydroxy acetophenone compound is preferably a compound represented by the following formula (VI).

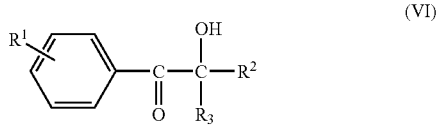

In formula (VI), $R^1$ represents a hydrogen atom, an alkyl group having 1 to 10 carbon atoms, or an alkoxy group having 1 to 10 carbon atoms. $R^2$ and $R^3$ each independently represent a hydrogen atom or an alkyl group having 1 to 10 carbon atoms. Further, $R^2$ and $R^3$ may be bonded to form a ring having 4 to 8 carbon atoms.

The alkyl group, the alkoxy group, the alkyl group and the ring having 4 to 8 carbon atoms may have a substituent and, the substituent referred to in formula (2) can be shown as an example of the substituent.

The α-hydroxyacetophenones include, for example, 2-hydroxy-2-methyl-1-phenylpropan-1-one (DAROCURE 1173), 2-hydroxy-2-methyl-1-phenylbutan-1-one, 1-(4-methylphenyl)-2-hydroxy-2-methylpropan-1-one, 1-(4-isopropylphenyl)-2-methylpropan-1-one, 1-(4-butylphenyl)-2-hydroxy-2-methylpropan-1-one, 2-hydroxy-2-methyl-1-(4-octylthiophenyl)propan-1-one, 1-(4-dodecylphenyl)-2-methylpropan-1-one, 1-(4-methoxyphenyl)-2-methylpropan-1-one, 1-(4-methylthiophenyl)-2-methylpropan-1-one, 1-(4-chlorophenyl)-2-hydroxy-2-methylpropan-1-one, 1-(4-bromophenyl)-2-hydroxy-2-methylpropan-1-one, 2-hydroxy-1-(4-hydroxyphenyl)-2-methylpropan-1-one, 1-(4-dimethylaminophenyl)-2-hydroxy-2-methylpropan-1-one, 1-(4-carboethoxyphenyl)-2-hydroxy-2-methylpropan-1-one, 1-hydroxycyclohexylphenylketone (IRGACURE 184), and 1-[4-(2-hydroxyethoxy)-phenyl]2-hydroxy-2-methyl-1-propan-1-one (IRGACURE 2959).

Further, as the commercial α-hydroxyacetophenone compound, polymerization initiators available from Ciba Specialty Chemicals Co. under the trade names of IRGACURE 184, DAROCURE 1173, IRGACURE 127, and IRGACURE 2959 can be used.

[Oxime Ester Compound]

The oxime ester compound is preferably a compound represented by the following formula (VII).

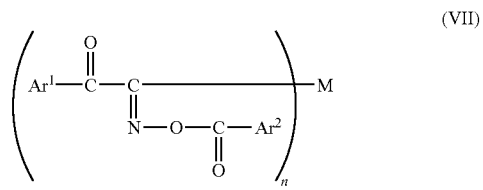

In formula (VII), $Ar^1$ represents a structure selected from the group consisting of a naphthalene structure, an anthracene structure, an anthraquinone structure, a benzophenone structure, a thianthrene structure, a phenoxathiane structure, a diphenylthioether structure, a thioxanthone structure, and a morpholinobenzene structure. Among them, the naphthalene structure, the anthraquinone structure, the benzophenone structure, the diphenyl thioether structure, the thioxanthone structure and the morpholino benzene structure are preferred, and the thioxanthone structure is particularly preferred. $Ar^2$ represents a phenyl group. The structures or the groups may also have a substituent, for example, an alkyl group such as a methyl group or an ethyl group, a halogen atom, or —CN (cyano group).

n represents an integer of 1 or 2.

When n is 1, M represents an alkyl group having 1 or more and 20 or less carbon atoms such as a methyl group or an ethyl group, a cycloalkyl group having 5 or more and 8 or less carbon atoms such as a cyclopropane group and a cyclohexane group, alkanoyl groups having 2 or more and 20 or less carbon atoms such as acetyloxy group and propionyloxy group, alkoxycarbonyl groups having 2 or more and 12 or less carbon atoms such as a propyloxycarbonyl group and butyloxycarbonyl group, a monovalent group in which an alkoxy group is connected to one of chemical bonds of a bivalent group formed by connecting a plurality of polymethylene groups by an etheric bond, a phenyl group, a benzoyl group, a benzoyloxy group, a phenoxycarbonyl group, an aralkyl carbonyloxy group having 7 or more and 13 or less carbon atoms, an aralkyloxycarbonyl group having 7 or more and 13 or less carbon atoms, or an alkylthio group having 1 or more and 6 or less carbon atoms. Among them, M represents preferably an alkyl group having one or more and 20 or less carbon atoms, or a phenyl group.

When n is 2, M represents an alkylene group having 1 or more and 12 or less carbon atoms such as an ethylene group and a propylene group, a polymethylene group having 3 or more and 12 or less carbon atoms such as a tetramethylene group, an oxyalkyleneoxy group having 1 or more and 12 or less carbon atoms such as an oxypropyleneoxy group and an oxybutyloxy group, a cyclohexylene group, a phenylene group, —CO—O-A-O—CO—, —CO—O—(CH$_2$CH$_2$O)$_m$—CO—, or —CO-A-CO— in which A represents an alkylene group having 2 or more and 12 or less carbon atoms, m represents an integer of 1 or more and 20 or less. Among them, M is preferably represents an alkylene group having 1 or more and 6 or less carbon atoms, a polymethylene group having 1 or more and 6 or less carbon atoms, or a cyclohexylene group.

The oxime ester compound includes specifically, for example, 3-benzoyloxyiminobutan-2-one, 3-acetoxyiminobutan-2-one, 3-propionyloxyiminobutan-2-one, 2-acetoxyiminopentan-3-one, 2-aceoxyimino-1-phenylpropan- 1-one, 2-benzoyloxyimino-1-phenylpropan-1-one, 3-p-tolueneslfonyloxyiminobutan-2-one, and 2-ethoxycarbonyloxyimino-1-phenylpropan-1-one.

Further, as the commercial oxime ester compound, polymerization initiators available from Ciba Specialty Chemicals Co. under the trade name of IRGACURE OXE-01 (1-(4-phenylthiophenyl)-1,2-octanedione-2-(O-benzyloxime)), IRGACURE OXE-02 (1-[9-ethyl-6-(2-methylbenzoyl)-9H-carbazol-3-yl]-ethanone-1-(O-acetyloxime) can be used.

Preferred specific examples of the photopolymerization initiator include those shown below.

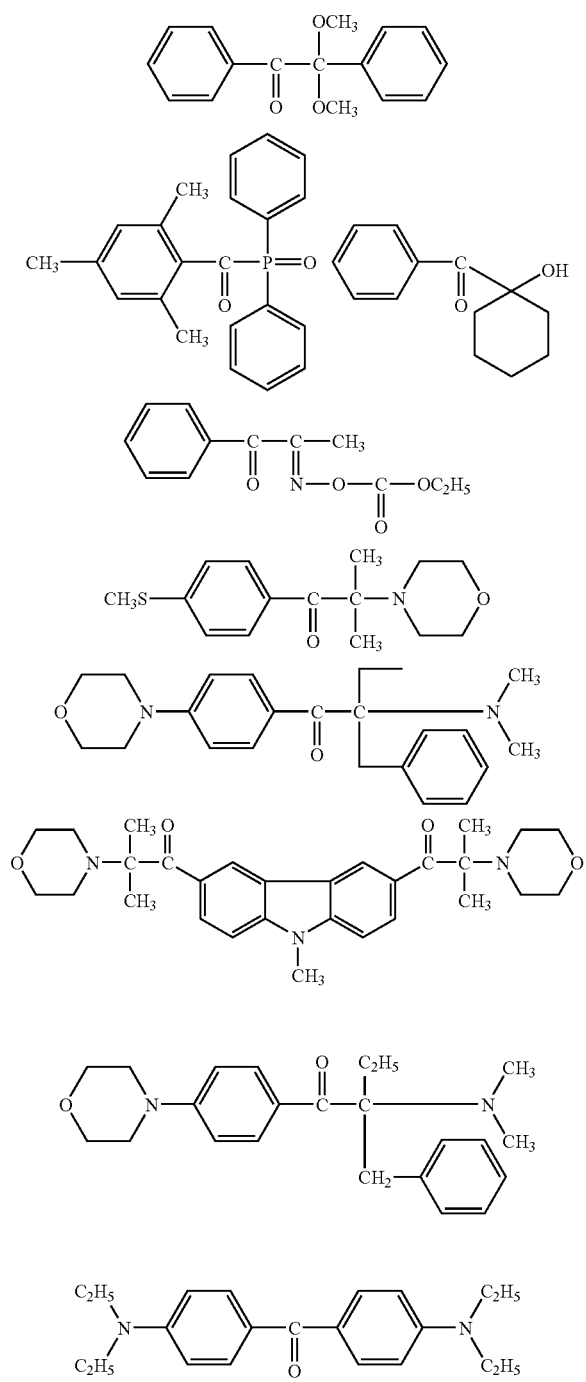
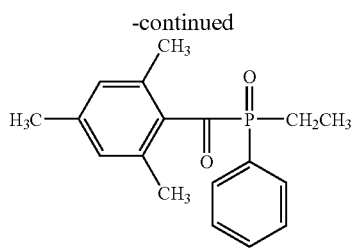
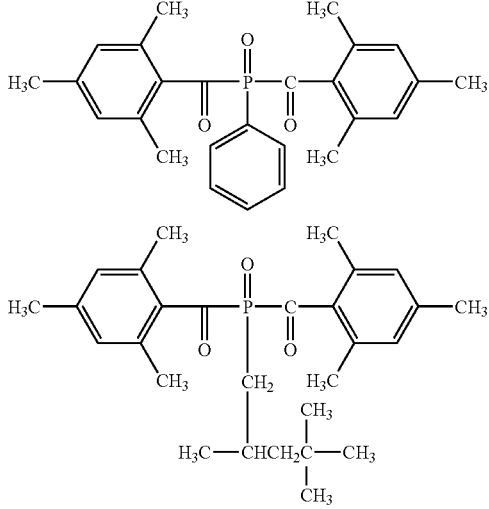
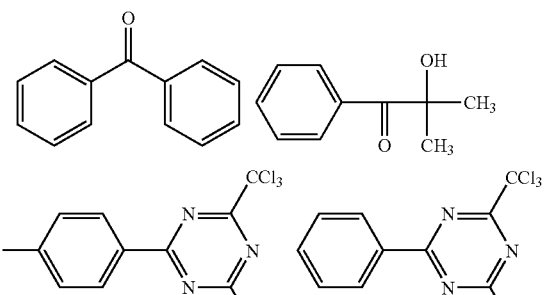
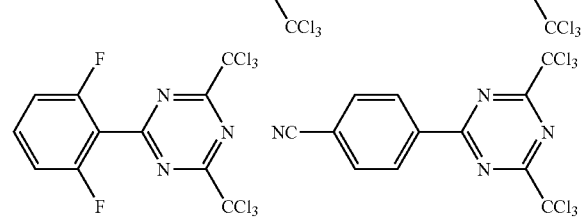
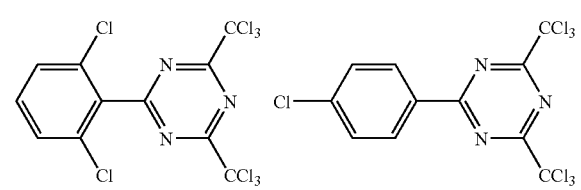
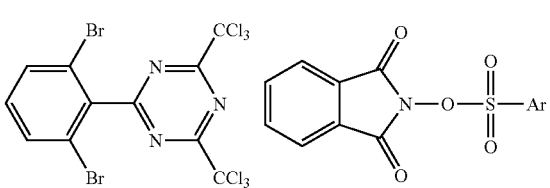

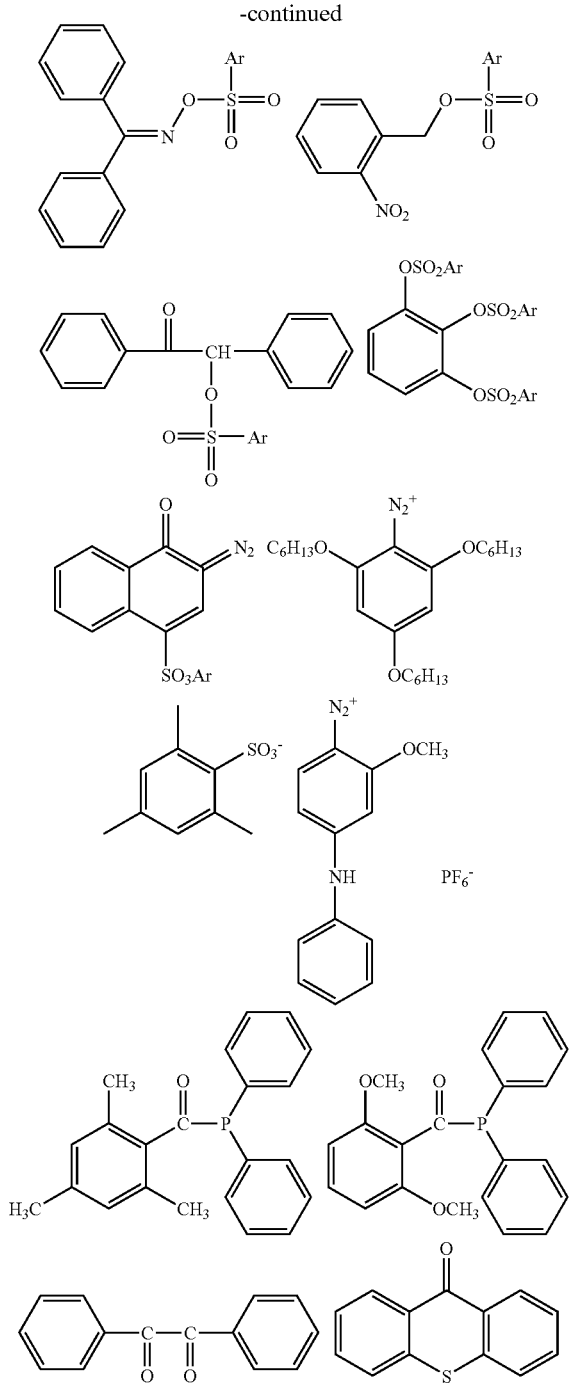

belonging to the following compounds and having an absorption wavelength in a range 350 nm to 450 nm are preferred.

The sensitizing dye includes, for example, polynuclear aromatics (for example, pyrene, perylene, triphenylene, and anthracene), xanthenes (for example, fluorescein, eosin, erythrocine, rhodamine B, and rose Bengal), cyanines (for example thiacarbocyanine, and oxacarbocyanine), merocyanine (for example, merocyanine and carbomerocyanine), thiazines (for example, thionine, methylene blue, and toluidine blue), acrydines (for example, acrydine orange, chloroflavin, acryflavin), anthraquinones (for example, anthraquinone), squaliums (for example, squalium), and coumarines (for example, 7-diethylamino-4-methyl coumarine).

Further, as the sensitizing dye compounds represented by the following formulae (IX) to (XIII) are more preferred.

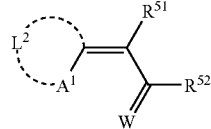

(IX)

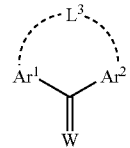

(X)

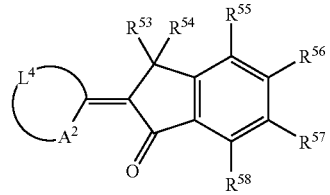

(XI)

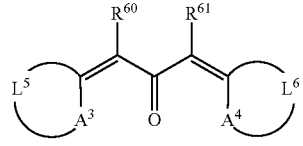

(XII)

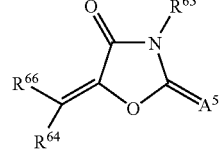

(XIII)

The polymerization initiator as the polymerization initiator can be used each alone or two or more of the initiators can be used in combination.

The content of the photopolymerization initiator in the ink composition is preferably from 0.1 to 20 mass %, more preferably form 0.5 to 15 mass %, and particularly preferably from 1 to 10 mass %.

2-4. Other Ingredients 2-4-1. Sensitizing Dye

In the ink composition of the invention, a sensitizing dye may be added with an aim of improving the sensitivity of the photopolymerization initiator. As the sensitizing dye, those In formula (IX), $A^1$ represents a sulfur atom or —$NR^{50}$—, in which $R^{50}$ represents an alkyl group or an aryl group, $L^2$ represents a non-metal atom group that forms a basic nuclei of a dye together with adjacent $A^2$ and adjacent carbon atoms, $R^{51}$ and $R^{52}$ each independently represent a hydrogen atom or a monovalent non-metal atom group, and $R^{51}$ and $R^{52}$ may be bonded to each other to form an acidic nuclei of a dye. W represents an oxygen atom or a sulfur atom.

In formula (X), $Ar^1$ and $Ar^2$ each independently represent an aryl group and are connected by way of a bond of -$L^3$-. In this case, $L^3$ represents —O— or —S—. Further, W has the same meanings as those shown for formula (IX).

In formula (XI), $A^2$ represents a sulfur atom or $NR^{59}$, $L^4$ represents a non-metal atom group forming a basic nuclei of a dye together with adjacent $A^2$ and carbon atoms, $R^{53}$, $R^{54}$, $R^{55}$, $R^{56}$, $R^{57}$, and $R^{58}$ each independently represent a monovalent non-metal atom group, and $R^{59}$ represents an alkyl group or an aryl group.

In formula (XII), $A^3$ and $A^4$ each independently represent —S— or —NR$^{62}$— or —NR$^{63}$—, $R^{62}$ and $R^{63}$ each independently represent a substituted or not-substituted alkyl group, or a substituted or not-substituted aryl group, $L^5$ and $L^6$ each independently represent a non-metal atom group forming a basic nuclei of a dye together with adjacent $A^3$, $A^4$ and adjacent carbon atoms, and $R^{60}$ and $R^{61}$ each independently represent a hydrogen atom or a monovalent non-metal atom group or can be bonded to each other to form an aliphatic or aromatic ring.

In formula (XIII), $R^{66}$ represents an aromatic ring or heterocyclic ring which may have a substituent, $A^5$ represents an oxygen atom, a sulfur atom, or —NR$^{67}$—. $R^{64}$, $R^{65}$, and $R^{67}$ each independently represent a hydrogen atom or a monovalent non-metal atom group, and $R^{67}$ and $R^{64}$, and $R^{65}$ and $R^{67}$ can be bonded to each other to form an aliphatic or aromatic ring.

Preferred specific examples of the compound represented by formulae (IX) to (XIII) include, for example, those exemplified compounds (A-1) to (A-24) shown below.

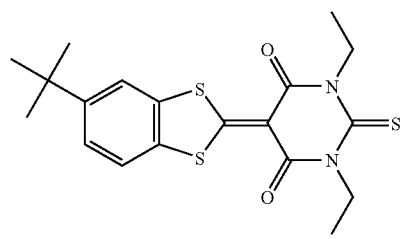
(A-1)

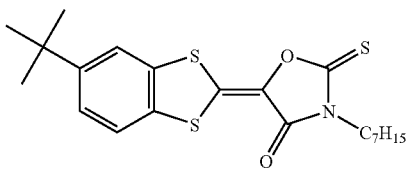
(A-2)

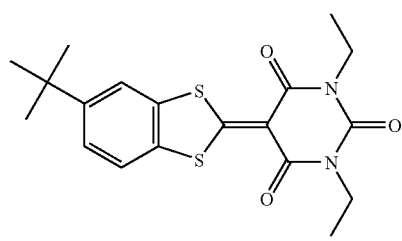
(A-3)

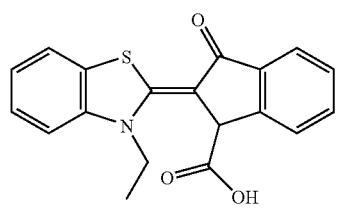
(A-4)

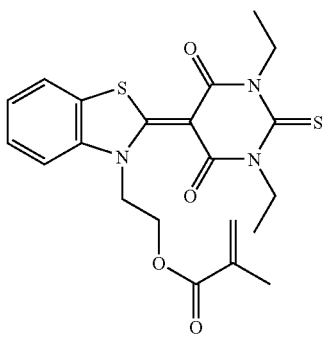
(A-5)

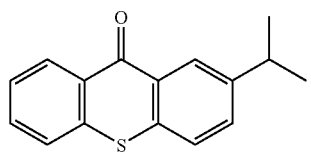
(A-6)

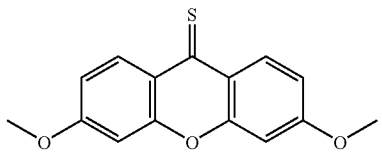
(A-7)

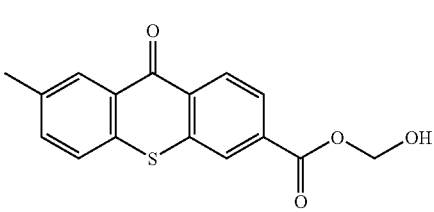
(A-8)

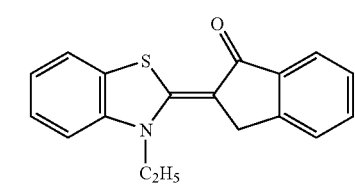
(A-9)

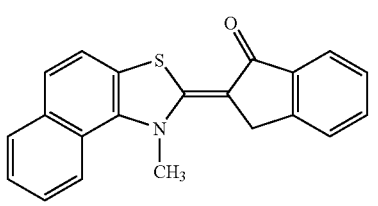
(A-10)

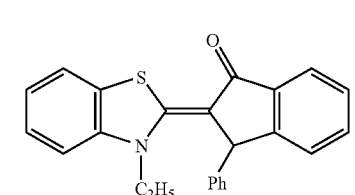
(A-11)

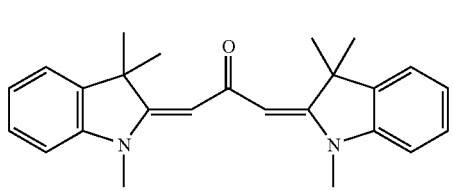
(A-12)

-continued

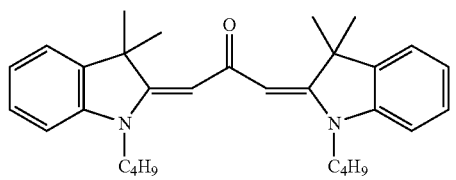
(A-13)

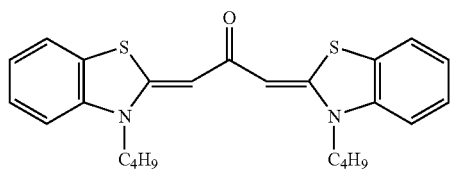
(A-14)

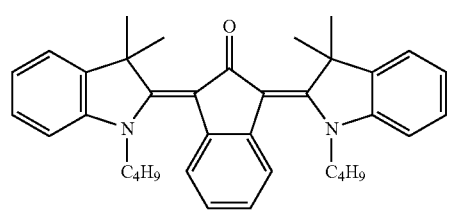
(A-15)

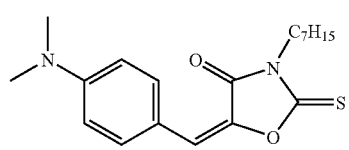
(A-16)

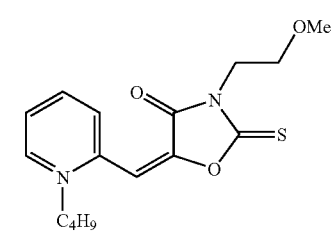
(A-17)

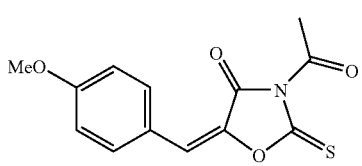
(A-18)

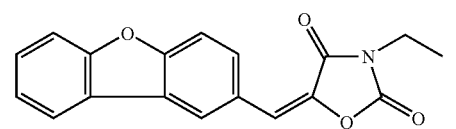
(A-19)

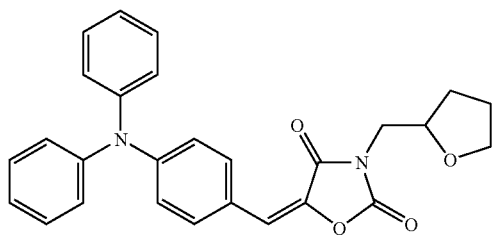
(A-20)

-continued

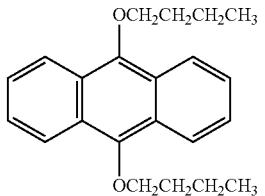
(A-21)

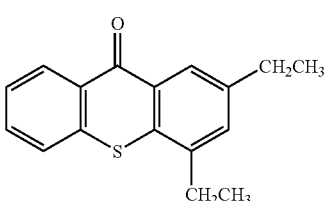
(A-22)

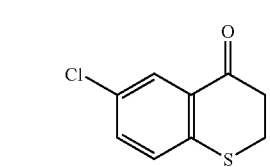
(A-23)

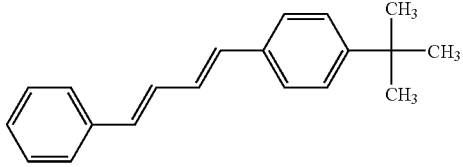
(A-24)

2-4-2. Cosensitizer

Further, a known compound having an effect of further improving the curing sensitivity of the ink composition of the invention, or suppressing inhibition of polymerization by oxygen may be added as a cosensitizer.

The cosensitizer includes amines, for example, compounds described, for example, in "Journal of Polymer Society", vol. 10, p 3173 (1972) written by M. R. Sander, et al., JP-B No. 44-20189, JP-A Nos. 51-82102, 52-134692, 59-138205, 60-84305, 62-18537, 64-33104, and Research Disclosure No. 33825. More specifically, they include triethanolamine, ethyl p-dimethylaminobenzoate ester, p-formyldimethyl aniline, and p-methylthiodimethyl aniline.

Other cosensitizers include thiol and sulfides, for example, thiol compounds described in JP-A No. 53-702, JP-B No. 55-500806, and JP-A No. 5-142772, and disulfide compounds described in JP-A No. 56-75643 and, more specifically, 2-mercaptobenzo thiazole, 2-mercaptobenzo oxazole, 2-mercaptobenzoimidazole, 2-mercapto-4(3H)-quinazoline, and β-mercaptonaphthalene.

Further, other cosensitizers include, for example, aminoacid compounds (for example, N-phenylglycidyl), organic metal compounds described in JP-B No. 48-42965 (for example, tributyl tin acetate), hydrogen donators described in JP-B No. 55-34414, sulfur compounds described in JP-A No. 6-308727 (for example, trithian), phosphorus compounds described in JP-A No. 6-250387 (diethyl pyhosphite, etc.), Si—H, Ge—H compounds, etc. described in JP-A No. 6-191605.

2-4-3. Other Additives

In the ink composition of the invention, various additives can be used together depending on the purpose in addition to the essential ingredients such as the pigment, the specific polymer (dispersing agent), the polymerizable compound, and the polymerization initiator, and the sensitizing dye and the cosensitizer used in combination therewith. For example, from a view point of improving the weather proofness and anti-discoloration of obtained images, a UV absorbent can be used. Further, for improving the stability of the ink composition, an antioxidant can be added. Additives usable in the ink composition of the invention are to be described below.

For the ink composition of the invention, various types of organic and metal complex type discoloration inhibitors, conductive salts such as potassium thiocyanate, lithium sulfate, ammonium thiocyanate, and dimethylamine hydrochloride can be added with an aim of controlling the injection property, and an extremely small amount of an organic solvent for improving the adhesion with the medium to be recorded.

For the ink composition of the invention, various types of polymerizable compounds can be added with an aim of controlling the film property. As the polymerizable compound, acrylic polymer, polyvinylbutyral resin, polyurethane resin, polyamide resin, polyester resin, epoxy resin, phenol resin, polycarbonate resin, polyvinyl butyral resin, polyvinyl formal resin, shellac, vinylic resin, acrylic resin, rubber type resin, waxes and other natural resins can be used. Further, two or more of them may be used in combination.

For the ink composition of the invention, nonionic surfactant, cationic surfactant, organic fluoro compound, etc. can also be added for controlling the liquid property.

Further, in addition, a leveling additive, a matting agent, waxes for controlling the film property, and a tackifier not inhibiting polymerization for improving adhesion to a medium to be recorded such as polyolefin or PET can be incorporated.

<Ink Composition for Inkjet>

One of preferred embodiments of the ink composition of the invention is an ink composition used for inkjet. The ink composition used for inkjet of the invention can be prepared as an actinic energy ray curable type ink composition. In this case, since radiation rays are irradiated for curing after application of the ink composition on a medium to be recorded, it is preferred that the solvent is not contained or contained by an extremely small amount. This is because of concerns about the deterioration of resistance to the solvent, lowering of blocking property, curing failure, and aging change of physical property of ink images caused by the remaining solvent, when the solvent remains in the cured ink images. With the view point described above, it is preferred to use the polymerizable compound and, among all, select a polymerizable compound of low viscosity as the dispersion medium from a view point of dispersion adaptability, improvement in handlability of the ink composition, and dischargeability of jetted ink. Since the ink composition applied with the pigment dispersion is cured at high sensitivity by the actinic radiation rays and has no worry of increase of viscosity and lowering of the coloring property due to the deterioration of the dispersion stability of the pigment, it can be used suitably to the inkjet ink applied to an inkjet recording method which is required to have viscosity stability as described later.

In a case of using the ink composition of the invention to an inkjet recording method, it is preferred that the ink viscosity is preferably 30 mPa·s or less at the temperature upon injection, and more preferably 20 mPa·s or less at the temperature upon injection, and that the compositional ratio is preferably controlled and decided so as to be within the range described above.

The ink viscosity at 25° C. (room temperature) is 0.5 mPa·s or more and 200 mPa·s or less, preferably 1 mPa·s or more and 100 mPa·s or less, and more preferably 2 mPa·s or more and 50 mPa·s or less. When the viscosity at the room temperature is set high, even in a case of using a porous medium to be recorded, penetration of the ink into the medium to be recorded can be prevented to decrease an uncured monomer and reduce odor and, further, dot bleeding upon hitting an ink droplet can be suppressed and, as a result, image quality can be improved. When the ink viscosity at 25° C. is higher than 200 mPa·s, this causes a problem in the delivery of the ink liquid.

The surface tension of the ink composition of the invention when used for inkjet is preferably from 20 mN/m to 40 mN/m, and more preferably from 23 mN/m to 35 mN/m. In a case of recording to various media to be recorded such as polyolefin, PET, coat paper or non-coat paper, it is preferably 20 mN/m or more from a view point of bleeding and penetration, and preferably 35 mN/m or less from a view point of wettability.

The ink composition prepared as described above is used suitably as an ink for inkjet recording. Recording is performed by printing the ink composition on a medium to be recorded by an inkjet printer and then irradiating radiation rays to the printed ink composition thereby curing the same.

In the Printed material obtained by the ink, since the image portion is cured by the irradiation of radiation rays such as UV-rays and is excellent in the strength, it can be used for various applications, for example, formation of an ink receiving layer (image portion) of a planographic printing plate, in addition to the image formation by the ink.

Then, an inkjet recording method and an inkjet recording apparatus that can be used in a case of applying the ink composition of the invention to the ink composition for inkjet are to be described below.

<Inkjet Recording Method>

In the recording method by the inkjet printer, it is preferred to inject the ink composition after controlling it to a temperature range of 25° C. to 80° C. thereby setting the viscosity of the ink composition to 30 mPa·s or lower, and high injection stability can be attained by using the method.

Generally, in a non-water soluble ink composition, since the viscosity is generally higher than that of an aqueous ink, the range of viscosity fluctuation due to the fluctuation of temperature is large during printing. Since the fluctuation of the viscosity of the ink composition directly gives a significant effect on the droplet size and the droplet injection speed, thereby bringing about the degradation of image quality, it is necessary that the temperature of the ink composition during printing is kept constant as much as possible. The control range for the temperature of the ink composition is preferably at setting temperature ±5° C., more preferably at setting temperature ±2° C., and particularly preferably at setting temperature ±1° C.

One of the features of the inkjet recording apparatus used for the inkjet recording method is the provision of stabilizing means for the temperature of the ink composition and all of pipeline systems and components from an ink tank (an intermediate tank if it is provided) to a nozzle injection surface are considered as the target to be controlled to a predetermined temperature.

While the method controlling the temperature control has no particular restriction, it is preferred to provide, for example, a plurality of temperature sensors to each of pipeline portions for controlling heating in accordance with the flow rate of the ink composition and the circumstantial temperature. Further, a head unit to be heated is preferably shield thermally or insulated thermally such that the apparatus main body does not undergo the effect of the temperature from the atmospheric air. For shortening the rising time of the printer required for heating, or decreasing the loss of heat energy, it is preferred to thermally insulate the heating unit from other portions and decrease the entire heat capacity of the unit.

The ink composition of the invention is formed as an actinic radiation ray curable ink composition by adding a photopolymerization initiator as the polymerization initiator.

Irradiation conditions of the actinic radiation rays in the ink composition are to be described. A basic irradiation method is disclosed in JP-A No. 60-132767. Specifically, light sources are disposed on both sides of the head unit, and the head and the light source are scanned by a shuttle system. Irradiation is performed at a predetermined time after ink hitting. Further, curing is completed by a separate light source with no driving. As an irradiation method, WO99/54415 discloses a method of using an optical fiber or a method of irradiating a UV light to a recording portion by hitting a collimated light source to a mirror surface disposed on the lateral side of the head unit. In the invention, the irradiation methods described above can be used.

Further, in a case of using the ink composition of the invention, it is preferred to heat the ink composition to a predetermined temperature and define the time from hitting to irradiation as: 0.01 to 0.5 sec, and radiation rays are irradiated preferably after 0.01 to 0.3 sec., and more preferably after 0.01 to 0.15 sec. By controlling the time from hitting to irradiation to an extremely short time as described above, bleeding of the hit ink before curing can be prevented.

Further, since exposure can be applied also to a porous medium to be recorded before the ink composition penetrates to such a depth as the light source can not reach, residue of unreacted monomer can be suppressed and, as a result, odors can be decreased.

By using the inkjet recording method and the ink composition of the invention in combination, a great synergistic effect is provided. Particularly, a significant effect can be obtained by using an ink composition having an ink viscosity of 200 mPa·s or less at 25° C.

By adopting the inkjet recording method described above, the dot diameter of the hit ink can be kept constant for various media to be recorded of different wettability at the surface and the image quality is improved. For obtaining color images, it is preferred to overlay from colors of lower brightness successively. When inks of low brightness are overlayed, radiation rays less reach as far as the ink at the lower portion tending to injure the curing sensitivity, increase the residual monomer, and generate odors and deteriorate the adhesion. Further, upon irradiation, while it is possible to apply exposure collectively by injecting inks of full colors, exposure on every one color is preferred from a view point of promoting curing.

The inkjet recording apparatus used in the invention has no particular restriction and commercial inkjet recording apparatus can be used. That is, in the invention, recording can be performed to a medium to be recorded by using a commercial inkjet recording apparatus.

According to the preferred injection conditions described above, while the ink composition of the invention is subjected to repetitive temperature rising and temperature falling, the ink composition of the invention has advantages capable of suppressing the lowering of the pigment dispersibility, obtaining an excellent color forming property over a long time, and also suppressing the lowering of the discheability caused by aggregation of the pigment, even in a case of storage under such temperature conditions.

<Medium to be Recorded>

A medium to be recorded to which the ink composition of the invention is applicable has no particular restriction and includes paper such as usual non-coat paper or coat paper, various non-absorptive resin materials used for so-called soft package, or a resin film formed by molding the material into a film shape. Various kinds of plastic films include, for example, PET film, OPS film, OPP film, ONy film, PVC film, PE film, and TAC film. In addition, plastics usable as the material to be recorded include, for example, polycarbonate, acryl resin, ABS, polyacetal, PVA and rubbers. Further, metals and glass materials can also be used as a medium to be recorded.

<Printed Material>

A printed material can be obtained preferably by printing the ink composition of the invention to a medium to be recorded by an inkjet printer and then curing the same by irradiating an actinic energy or applying heating to the printed ink composition. In the Printed material prepared from the ink composition of the invention, since the ink used for forming images contains fine pigment particles uniformly and in a stably dispersed state, it has high quality images excellent in the color forming property and the sharpness and is also has excellent weather proofness of the images, it can be applied over an extensive region.

EXAMPLES

The present invention is to be described more specifically by way of examples, but the invention is not restricted to the embodiment of the examples.

Synthesis of Specific Polymer

Synthesis of Monomer M-4

15 g of 9(10H)acridone (manufactured by Wako Pure Chemical Industries Ltd.) and 3.4 g of sodium hydroxide (manufactured by Wako Pure Chemical Industries Ltd.) were dissolved in 84 g of dimethyl sulfoxide (manufactured by Wako Pure Chemical Industries Ltd.) and heated to 45° C. 17.6 g of CMS-P (chloromethyl styrene, manufactured by Seimi Chemical Co.) was dropped thereto and further stirred under heating at 50° C. for 5 hours. The reaction solution was poured while stirring to a mixed solution containing 30 g of distilled water and 30 g of methanol (manufactured by Wako Pure Chemical Industries Ltd.), obtained precipitates were separated by filtration and washed with 300 g of a solution formed by mixing distilled water and methanol each by an identical mass to obtain 17.5 g of Monomer M-4.

Synthesis of Monomer M-17

355.0 g of 1,8-naphthalimide (manufactured by Kanto Chemical Co., Inc.) was dissolved in 1500 mL of N-methylpyrrolidone (manufactured by Wako Pure Chemical Industries Ltd.), and 0.57 g of nitrobenzene (manufactured by Wako Pure Chemical Industries Ltd.) was added at 25° C., to which 301.4 g of DBU (diazabicycloundecene) (manufactured by Wako Pure Chemical Industries Ltd.) was dropped. After stirring for 30 min., 412.1 g of CMS-P was dropped and further stirred under heating at 60° C. for 4 hours. 2.7 L of isopropanol (manufactured by Wako Pure Chemical Industries Ltd.) and 0.9 L of distilled water were added to the reaction solution, and stirred while cooling to 5° C. The obtained precipitates were separated by filtration and washed with 1.2 L of isopropanol to obtain 544.0 g of Monomer M-17.

Synthesis of Monomer M-18

133.2 g of 2-aminobenzimidazole was dissolved in 1000 mL of N-methylpyrrolidone, and 0.29 g of nitrobenzene was added at 25° C. After dropping 155.2 g of 2-methacryloyloxy-ethyl isocyanate thereto and stirring for 30 min., they were stirred at 80° C. for one hour. 4000 mL of methanol was added to the reaction solution and stirred. The obtained precipitates were separated by filtration and washed with 1200 mL of methanol to obtain 262.4 g of Monomer M-18.

Synthesis of Specific Polymer P-2

4.0 g of (tert-butylamino)ethyl methacrylate (manufactured by Aldrich Corp), 2.0 g of Monomer M-4, 14.0 g of group at a terminal end thereof, trade name: BLEMMER PME-4000, weight average molecular weight 4000), Polymerizable oligomer N-6 (poly(ethylene oxide)macromonomer having a methacryloyl group at a terminal end thereof, trade name: BLEMMER ALE-800, weight average molecular weight 800).

TABLE 1

| Specific polymer | | Monomer providing repeating unit represented by formula (1) | | Monomer providing repeating unit represented by formula (2) | | Polymerizable oligomer | | Polymerization initiator | Weight average molecular |
|---|---|---|---|---|---|---|---|---|---|
| Type | Composition | Type | Amount of use | Type | Amount of use | Type | Amount of use | Amount of use | weight |
| P-2  | A-2/M-4/N-1 copolymer  | A-2 | 4.0 g | M-4  | 2.0 g | N-1 | 14.0 g | 80 mg  | 86000  |
| P-3  | A-2/M-4/N-2 copolymer  | A-2 | 2.0 g | M-4  | 2.0 g | N-2 | 14.0 g | 120 mg | 60000  |
| P-5  | A-2/M-4/N-5 copolymer  | A-2 | 6.0 g | M-4  | 1.0 g | N-5 | 13.0 g | 80 mg  | 106000 |
| P-9  | A-2/M-17/N-1 copolymer | A-2 | 2.0 g | M-17 | 4.0 g | N-5 | 14.0 g | 80 mg  | 120000 |
| P-11 | A-3/M-4/N-6 copolymer  | A-3 | 8.0 g | M-4  | 2.0 g | N-1 | 10.0 g | 160 mg | 53000  |
| P-15 | A-3/M-17/N-4 copolymer | A-3 | 2.0 g | M-17 | 4.0 g | N-4 | 14.0 g | 40 mg  | 232000 |
| P-17 | A-3/M-18/N-1 copolymer | A-3 | 4.0 g | M-18 | 1.0 g | N-1 | 15.0 g | 80 mg  | 98000  |
| P-21 | A-3/M-10/N-2 copolymer | A-3 | 4.0 g | M-10 | 2.0 g | N-2 | 14.0 g | 120 mg | 54000  |

Polymerizable oligomer N-1 [poly(methyl methacrylate) macromonomer having a methacryloyl group at a terminal end thereof, trade name: AA-6, manufactured by Toagosei Co., Ltd., weight average molecular weight of 5300] and 20 g of methyl ethyl ketone were introduced into a nitrogen-substituted three-necked flask, and stirred by a stirrer (three-one motor: manufactured by Shinto Scientific Co., Ltd.) and they were heated to 65° C. while flowing nitrogen through the inside of the flask. 40 mg of 2,2-azobis(2,4-dimethylvaleronitrile (V-65, manufactured by Wako Pure Chemical Industries Ltd.) was added thereto and stirred under heating at 65° C. for 2 hours. After 2 hours, 40 mg of V-65 was further added and stirred under heating for 3 hours. The obtained reaction solution was poured while stirring into 1000 mL of hexane and resultant precipitates were heated and dried to obtain a graft copolymer 1. The graft copolymer 1 is a graft copolymer described above as the exemplified compound P-1 (copolymer synthesized from Monomer A-2/Monomer M-4/Polymerizable oligomer N-1).

Since the weight average molecular weight (in term of polystyrene) of the graft copolymer 1 was 84,500 as a result of GPC measurement, it was confirmed that the specific polymer was obtained.

Synthesis of Specific Polymers P-3, P-5, P-9, P-11, P-15, P-17, and P-21

Specific polymers P-3, P-5, P-9, P-11, P-15, P-17, and P-21 were synthesized in the same manner as in the synthesis of the specific polymer P-2 except for changing the monomers and the amount of use thereof, and the amount of the polymerization initiator used for the synthesis of the specific polymer P-2 as described in the following Table 1. The weight average molecular weight of the resultant specific polymers by GPC was as shown in Table 1.

Commercially available products were used as they were for Monomer A-3 (tetramethylpiperidyl methacrylate, manufactured by Hitachi Chemical Co., Ltd.), Monomer M-10 (N-vinylcarbazole, manufactured by Aldrich Corp.), Polymerizable oligomer N-2 (poly(n-butyl acrylate)macromonomer having a methacryloyl group at a terminal end thereof, trade name: AB-6, manufactured by Toagosei Co., Ltd., weight average molecular weight 5600), Polymerizable oligomer N-4 (poly(ε-caprolactone)macromonomer having a methacryloyl group at a terminal end thereof, trade name: PLACCEL FM5, manufactured by Daicel Chemical Industries, molecular weight 1400), Polymerizable oligomer N-5 (poly(ethyleneoxide)macromonomer having a methacryloyl Synthesis of Comparative Polymer 1

4.0 g of a monomer having a tertiary amino group [(N,N-dimethylamino)ethyl methacrylate, manufactured by Tokyo Chemical Industry Co., Ltd.], 2.0 g of Monomer M-4, 14.0 g of the Polymerizable oligomer N-1 (trade name: AA-6, manufactured by Toagosei Co., Ltd.), and 20 g of methyl ethyl ketone were introduced into a nitrogen-substituted three-necked flask, stirred by a stirrer (three-one motor, manufactured by Shinto Scientific Co., Ltd.) and heated to a temperature of 65° C. while flowing nitrogen in the flask. 40 mg of V-65 was added thereto, and stirred under heating for 2 hours at 65° C. After 2 hours, 400 mg of V-65 was further added and stirred under heating for three hours. The obtained reaction solution was poured while stirring into 1000 mL of hexane and the resultant precipitates were heated and dried to obtain a graft copolymer (Comparative polymer 1: copolymer of (N,N-dimethylamino)ethyl methacrylate/Monomer M-4/Polymerizable oligomer N-1). The weight average molecular weight of the obtained comparative polymer 1 was 10500.

Synthesis of Comparative Polymer 2

2.0 g of a monomer having a tertiary amino group [3-dimethylaminopropyl acrylamide, manufactured by Wako Pure Chemical Industries Ltd.], 4.0 g of the Monomer M-17, 14.0 g of the Polymerizable oligomer N-2 (trade name: AB-6, manufactured by Toagosei Co., Ltd.), and 20 g of methyl ethyl ketone were introduced into a nitrogen-substituted three-necked flask, stirred by a stirrer (three-one motor, manufactured by Shinto Scientific Co., Ltd.) and heated to a temperature of 65° C. while flowing nitrogen in the flask. 40 mg of V-65 was added thereto, and stirred under heating for 2 hours at 65° C. After 2 hours, 40 mg of V-65 was further added and stirred under heating for 3 hours. The obtained reaction solution was poured while stirring into 1000 mL of methanol and the resultant precipitates were heated and dried to obtain a graft copolymer (Comparative polymer 2: copolymer of 3-dimethylaminopropyl acrylamide/M-17/N-2). The weight average molecular weight of the obtained comparative polymer 2 was 72300.

Synthesis of Comparative Polymer 3

4.0 g of a monomer having a carboxyl group [methacrylic acid, manufactured by Wako Pure Chemical Industries Ltd.], 1.0 g of Monomer M-18, 14.0 g of Polymerizable oligomer N-1 (trade name: AA-6, manufactured by Toagosei Co., Ltd.), and 20 g of methyl ethyl ketone were introduced into a nitrogen-substituted three-necked flask, stirred by a stirrer (three-one motor, manufactured by Shinto Scientific Co., Ltd.) and heated to a temperature of 65° C. while flowing nitrogen in the flask. 40 mg of V-65 was added thereto, and stirred under heating for 2 hours at 65° C. After 2 hours, 40 mg of V-65 was further added and stirred under heating for 3 hours. The obtained reaction solution was poured while stirring into 1000 mL of hexane and the resultant precipitates were heated and dried to obtain a graft copolymer (Comparative polymer 2: copolymer of methacylic acid/M-17/N-1). The weight average molecular weight of the obtained comparative polymer 3 was 111000.

Examples 1-1 to 1-9, Comparative Examples 1-1 to 1-7

Preparation of Mill Base 1 to 16

8.0 g of the specific polymer (b) was dissolved in 62 g of the polymerizable compound (c) [triethylene glycol divinyl ether, trade name: DVE-3, manufactured by BASF Co.], and dispersed together with 30 g of the pigment (a) by using a bead mill (motor mill M100, manufactured by Eiger Co.), beads: zirconia beads, 0.65 mm diameter) at a peripheral speed of 7.1 m/s for 2.5 hours to obtain mill bases (concentrated pigment dispersion liquid)1 to 16 as pigment dispersions of Examples 1-1 to 1-9 and Comparative Examples 1-1 to 1-7.

The specific polymer and the pigment used for the preparation of each mill bases are as described in the following Table 2.

In Table 2, the yellow pigment PY-120 is a benzimidazolone type yellow pigment, and "Novoperm Yellow H2G" manufactured by Clariant Co. was used. The orange pigment PO-36 is a benzimidazolone type orange pigment and "KENALAKE ORANGE HPRO" manufactured by Albion Colors Co. was used. The magenta pigment PR-42 is a quinacridone type pigment and "Cinquacia Magenta RT-355D" manufactured by Ciba Specialty Chemicals Co. was used.

Further, for Comparative Examples 1-4 and 1-6, Disperbyk-168 manufactured by BYK Chemie. was used as a commercially available comparative dispersing agent.

Evaluation for Mill Base

Each of the obtained mill bases were evaluated in accordance with the following evaluation method. The results are also shown in Table 2.

(1) Particle Diameter

For each mill base, cumulative 90% particle diameter D90 on the volume base was measured and evaluated by using a light scattering diffraction type grain size distribution measuring equipment (LA910, manufactured by Horiba Inc.). The evaluation criteria thereof are as shown below.

In the case of a mill base using PY-120 as a pigment.
A: D90 is less than 400 nm
B: D90 is 400 nm or more and less than 600 nm
C: D90 is 600 nm or more
In the case of a mill base using PO-36 as a pigment.
A: D90 was less than 400 nm
B: D90 was 400 nm or more and less than 600 nm
C: D90 was 600 nm or more
In the case of a mill base using PR-42 as a pigment.
A: D90 was less than 300 nm
B: D90 was 300 nm or more and less than 600 nm
C: D90 was 600 nm or more (2) Increase in the Viscosity After Dispersion After dispersing each mill base, 25 ml thereof was transferred to a 50 ml beaker, and after settling at a room temperature for one hour, the fluidity of the mill base was confirmed. The evaluation criteria thereof are as described below.

A: Mill base kept the same fluidity as that just after dispersion

B: Mill base increased in viscosity and did not flow significantly even when a beaker was tilted, but developed fluidity when stirred.

C: Mill base increased in viscosity and did not flow even when beaker was tilted, and did not develop fluidity even when stirred.

TABLE 2

| | Mill base No. | Pigment dispersing agent | Pigment | Particle diameter | Increase of viscosity after dispersion |
|---|---|---|---|---|---|
| Example 1-1 | Mill base 1 | Specific polymer P-2 | PY-120 | A | A |
| Example 1-2 | Mill base 2 | Specific polymer P-3 | PY-120 | A | A |
| Example 1-3 | Mill base 3 | Specific polymer P-9 | PY-120 | A | A |
| Example 1-4 | Mill base 4 | Specific polymer P-5 | PY-120 | A | A |
| Example 1-5 | Mill base 5 | Specific polymer P-21 | PY-120 | A | B |
| Comparative Example 1-1 | Mill base 6 | Comparative polymer 1 | PY-120 | A | C |
| Comparative Example 1-2 | Mill base 7 | Comparative polymer 2 | PY-120 | A | C |
| Comparative. Example 1-3 | Mill base 8 | Comparative polymer 3 | PY-120 | C | C |
| Comparative Example 1-4 | Mill base 9 | Comparative dispersing agent Disperbyk-168 | PY-120 | C | A |
| Example 1-6 | Mill base 10 | Specific polymer P-2 | PO-36 | A | A |
| Example 1-7 | Mill base 11 | Specific polymer P-9 | PO-36 | A | A |
| Comparative Example 1-5 | Mill base 12 | Comparative polymer 1 | PO-36 | C | C |
| Comparative Example 1-6 | Mill base 13 | Comparative dispersing agent Disperbyk-168 | PO-36 | C | B |
| Example 1-8 | Mill base 14 | Specific polymer P-2 | PR-42 | A | A |
| Example 1-9 | Mill base 15 | Specific polymer P-9 | PR-42 | A | A |
| Comparative Example 1-7 | Mill base 16 | Comparative polymer 3 | PR-42 | C | C |

It can be seen from Table 2 that, in Examples 1-1 to 1-9, a mill base at high concentration in which the pigment was finely dispersed could be prepared by using the specific polymer as the pigment dispersing agent, and dispersion stability was high and an increase in viscosity after dispersion was suppressed. On the other hand, when using the commercially available pigment dispersing agent and the comparative copolymer as the pigment dispersing agent as in each of the comparative examples, dispersion stability was insufficient, and problems occurred such as the pigment was sometimes did not become sufficiently fine, and the viscosity of the mill base increased after dispersion.

Examples 2-1 to 2-9, Comparative Examples 2-1 to 2-7

Preparation of Inkjet Ink 1

After adding the polymerizable compound and the polymerization initiator to the mill base 1 and mixing them moderately, they were filtered under pressure through a membrane filter to obtain an inkjet ink 1 as the ink composition of Example 2-1. The addition amount of the mill base 1, and the type and the addition amount of the polymerizable compound and the polymerization initiator are shown below.
Mill Base 1 10 g
Polymerizable compound
(1) Dipropylene glycol diacrylate (SR508, manufactured by Sartomer Company Inc.)
30 g
(2) 1,6-hexanediol diacrylate (SR238, manufactured by Sartomer Company Inc.)
30 g
(3) 2-phenoxyethyl acrylate (SR339, manufactured by Sartomer Company Inc)
19.8 g
Polymerization initiator:
(1) Acylphosphine oxide compound (Lucirin TPO-L, manufactured by BASF Co.)
8.0 g
(2) IRGACURE 184 (manufactured by Ciba Specialty Chemicals Co.)
2.0 g
(3) Benzophenone (manufactured by Wako Pure Chemicals Industries Ltd.)
2.0 g
Surfactant BYK-307 (manufactured by BYK Chemie) 0.1 g
Polymerization inhibitor: methoxy hydroquinone
(manufactured by Tokyo Chemical Industry Co., Ltd.) 0.1 g
Preparation of Inkjet Inks 2 to 16
Inkjet inks 2 to 16 as ink compositions of Examples 2-1 to 2-9 and Comparative Examples 2-2 to 2-7 were obtained in the same manner as in the preparation of the inkjet ink 1 except for changing the mill base 1 used in the preparation of the inkjet ink 1 to the mill bases 2 to 16 obtained in the preparation of the mill bases described above respectively.
Evaluation for Inkjet Inks 1 to 16

Each of the obtained inkjet inks were evaluated in accordance with the evaluation method described below. The results are shown in Table 3.
(1) Viscosity
The viscosity for each of the inkjet inks at 40° C. was measured by using E type viscometer (manufactured by TOKI SANGYO CO., LTD.).
A: less than 15 mPas
B: 20 mPas or more and less than 40 mPas
C: 40 mPas or more (level causing problem in view of discharge)
(2) Viscosity Stability (Dispersion Stability)
Dispersion state in the viscosity after storing at 25° C. for one month, and after storing at 60° C. for one week were evaluated was for each of the inkjet inks
A: Increase in the viscosity was less than 2%, with no problem in the dischargeability
B: Increase in the viscosity was 2 or more and less than 5% with no problem in the dischargeability
C: Increase in the viscosity was 5% or more and less than 10%, at a level of lowering the discharge stability
D: Increase in the viscosity was 10% or more, at a level of remarkably lowering the discharge stability.
(3) Particle Diameter
For each mill base, cumulative 90% particle diameter D90 on the volume base was measured and evaluated by using a light scattering diffraction type grain size distribution measuring equipment (LA910, manufactured by Horiba Inc.). The evaluation criteria thereof are as shown below.
In the case of an inkjet ink using PY-120 as a pigment.
A: D90 was less than 400 nm
B: D90 was 400 nm or more and less than 600 nm
C: D90 was 600 nm or more
In the case of a inkjet ink using PO-36 as a pigment.
A: D90 was less than 400 nm
B: D90 was 400 nm or more and less than 600 nm
C: D90 was 600 nm or more
In the case of an inkjet ink using PR-42 as a pigment.
A: D90 was less than 300 nm
B: D90 was 300 nm or more and less than 600 nm
C: D90 was 600 nm or more
(4) Curability
After printing each of the obtained inkjet inks on a vinyl chloride film by using a piezo type inkjet head (CA3 head, manufactured by Toshiba Tec Corporation, printing density: 300 dpi, hitting frequency: 4 kHz, number of nozzles: 64), it was exposed under the condition at an energy of 1000 mH/cm$^2$ by a Deep UV lamp (manufactured by Ushio Inc., SP-7) to obtain printed samples.
The curability was evaluated by touching the cured film with a finger for the presence or absence of stickiness by the following evaluation criteria.
A: with no sticking
B: slight sticking
C: remarkable sticking

TABLE 3

| | | | | | | Evaluation for ink composition | | | |
| --- | --- | --- | --- | --- | --- | --- | --- | --- | --- |
| | Name of Ink | Mill base used | Pigment dispersing agent | Pigment | Viscosity | Dispersion stability (room temperature) | Dispersion stability (60° C.) | Particle diameter | Curability |
| Example 2-1 | Inkjet ink 1 | Mill base 1 | Specific polymer P-2 | PY-120 | A | A | A | A | A |
| Example 2-2 | Inkjet ink 2 | Mill base 2 | Specific polymer P-3 | PY-120 | A | A | A | A | A |

TABLE 3-continued

| | Name of Ink | Mill base used | Pigment dispersing agent | Pigment | Viscosity | Dispersion stability (room temperature) | Dispersion stability (60° C.) | Particle diameter | Curability |
|---|---|---|---|---|---|---|---|---|---|
| Example 2-3 | Inkjet ink 3 | Mill base 3 | Specific polymer P-9 | PY-120 | A | A | B | B | B |
| Example 2-4 | Inkjet ink 4 | Mill base 4 | Specific polymer P-5 | PY-120 | A | A | A | A | A |
| Example 2-5 | Inkjet ink 5 | Mill base 5 | Specific polymer P-21 | PY-120 | A | A | B | A | A |
| Comparative Example 2-1 | Inkjet ink 6 | Mill base 6 | Comparative polymer 1 | PY-120 | A | B | C | B | A |
| Comparative Example 2-2 | Inkjet ink 7 | Mill base 7 | Comparative polymer 2 | PY-120 | B | A | C | B | B |
| Comparative Example 2-3 | Inkjet ink 8 | Mill base 8 | Comparative polymer 3 | PY-120 | C | C | D | C | B |
| Comparative Example 2-4 | Inkjet ink 9 | Mill base 9 | Comparative dispersing agent Disperbyk-168 | PY-120 | A | B | D | C | A |
| Example 2-6 | Inkjet ink 10 | Mill base 10 | Specific polymer P-2 | PO-36 | A | A | A | A | A |
| Example 2-7 | Inkjet ink 11 | Mill base 11 | Specific polymer P-9 | PO-36 | A | B | B | B | A |
| Comparative Example 2-5 | Inkjet ink 12 | Mill base 12 | Comparative polymer 1 | PO-36 | A | B | C | C | B |
| Comparative Example 2-6 | Inkjet ink 13 | Mill base 13 | Comparative dispersing agent Disperbyk-168 | PO-36 | B | C | C | C | B |
| Example 2-8 | Inkjet ink 14 | Mill base 14 | Specific polymer P-2 | PR-42 | A | A | A | A | A |
| Example 2-9 | Inkjet ink 15 | Mill base 15 | Specific polymer P-9 | PR-42 | A | A | B | A | B |
| Comparative. Example 2-7 | Inkjet ink 16 | Mill base 16 | Comparative polymer 3 | PR-42 | C | C | D | C | B |

As shown in Table 3, each of the inkjet inks of the examples using the specific polymer as the pigment dispersing agent could be stored stably for a long time not only at a room temperature but also at a high temperature. Further, the particle diameter was also small, and thus the particles were fine. Accordingly, it can be supposed that each of the inkjet inks of the examples is an ink of excellent image clarity and also favorable in view of the dischargeability. On the other hand, in each of the inkjet inks of the comparative examples using the commercially available dispersing agent and the comparative polymer as the pigment dispersing agent, it can be seen that the stability thereof is poor particularly at a high temperature. Accordingly, in each of the inkjet inks of the comparative examples, it can be supposed that discharge stability worsens after storage at a high temperature, and irregularities in the form of streaks are caused in images created therewith.

In view of the above, since the specific polymer used in the examples has as a basic structure the interaction site with the pigment and a secondary amino group having excellent adsorption with respect to the pigment, it has excellent adsorption with respect to the pigment; further, since the specific polymer is a graft copolymer, and is configured such that steric repulsion due to the polymer chain is exerted effectively, it can be supposed that the pigment can be dispersed extremely stably in an organic solvent due to the excellent adsorption effect and the effect of dispersion stabilization of the specific polymer with respect to the pigment.

All publications, patent applications, and technical standards mentioned in this specification are herein incorporated by reference to the same extent as if each individual publication, patent application, or technical standard was specifically and individually indicated to be incorporated by reference.

What is claimed is:

1. A pigment dispersion comprising at least a pigment at a concentration of from 2 to 50 mass % in the pigment dispersion, and a polymer having from 2 to 50 mass % of repeating units represented by the following formula (1) and from 2 to 40 mass % of repeating units represented by the following formula (2) and having a weight average molecular weight of from 10,000 to 500,000:

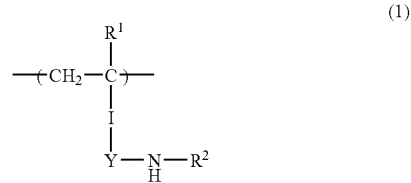

wherein, $R^1$ represents a hydrogen atom or a methyl group; I represents —COO—, —CONR$^3$—, —OCO—, or a phenylene group; $R^3$ represents a hydrogen atom, an alkyl group, an aryl group or an aralkyl group; Y represents a single bond or a bivalent linking group; $R^2$ represents an alkyl group having 1 to 4 carbon atoms; and $R^2$ and Y may be bonded to each other to form a ring structure:

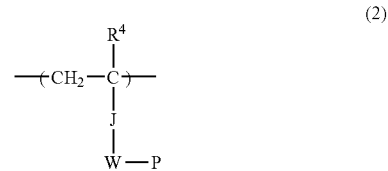

wherein, $R^4$ represents a hydrogen atom or a methyl group; J represents —CO—, —COO—, —CONR$^5$—, —OCO—, or a phenylene group; $R^5$ represents a hydrogen atom, an alkyl group, an aryl group, or an aralkyl group; W represents a single bond or a bivalent linking group; and P represents a heterocyclic residue having a heterocyclic ring contained in an organic pigment.

2. The pigment dispersion according to claim 1, wherein P in formula (2) is a group formed by removing one hydrogen atom from quinacridone, benzimidazolone, indole, quinoline, carbazole, acridine, acridone, anthraquinone, phthalimide or naphthalimide.

3. The pigment dispersion according to claim 1, wherein the polymer is a graft copolymer further comprising repeating units derived from a polymerizable oligomer having a weight average molecular weight of 500 to 20,000 and having an ethylenically unsaturated double bond at a terminal end thereof.

4. The pigment dispersion according to claim 1, wherein a content of the polymer, with respect to the entire mass of the pigment, is from 1 to 100 mass %.

5. The pigment dispersion according to claim 1, further comprising a polymerizable compound.

6. An ink composition comprising: at least a pigment dispersion according to claim 5, and a polymerization initiator, wherein a concentration of the pigment is from 1 to 10 mass %.

7. The ink composition according to claim 6, wherein a content of the polymerizable compound, with respect to the entire mass of the ink composition, is from 60 to 95 mass %.

8. The ink composition according to claim 6, wherein the ink composition is used for inkjet.

* * * * *